United States Patent
Kamegaya et al.

(10) Patent No.: US 7,987,263 B2
(45) Date of Patent: Jul. 26, 2011

(54) BANDWIDTH CONTROL SERVER, COMPUTER READABLE RECORD MEDIUM ON WHICH BANDWIDTH CONTROL PROGRAM IS RECORDED, AND MONITORING SYSTEM

(75) Inventors: Masakatsu Kamegaya, Kawasaki (JP); Kunikazu Takahashi, Kawasaki (JP); Noboru Matsubara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 144 days.

(21) Appl. No.: 12/366,997

(22) Filed: Feb. 6, 2009

(65) Prior Publication Data
US 2009/0204707 A1    Aug. 13, 2009

(30) Foreign Application Priority Data
Feb. 8, 2008 (JP) ................................ 2008-028741

(51) Int. Cl.
G06F 15/16 (2006.01)
(52) U.S. Cl. ......................... 709/224; 340/506; 348/143
(58) Field of Classification Search .................. 709/224; 340/506; 348/143
See application file for complete search history.

(56) References Cited

U.S. PATENT DOCUMENTS

| | | | |
|---|---|---|---|
| 6,292,098 B1 * | 9/2001 | Ebata et al. .................... | 340/506 |
| 2005/0162268 A1 * | 7/2005 | Grindstaff et al. ............ | 340/531 |
| 2005/0226463 A1 * | 10/2005 | Suzuki et al. ................. | 382/103 |
| 2006/0053459 A1 * | 3/2006 | Simerly et al. ................ | 725/105 |
| 2006/0238617 A1 * | 10/2006 | Tamir ............................. | 348/143 |
| 2006/0271658 A1 * | 11/2006 | Beliles et al. ................. | 709/223 |
| 2007/0174467 A1 * | 7/2007 | Ballou et al. .................. | 709/227 |
| 2008/0177688 A1 * | 7/2008 | Friedlander et al. ............ | 706/46 |
| 2008/0238651 A1 * | 10/2008 | Kucharyson ................... | 340/506 |
| 2008/0303903 A1 * | 12/2008 | Bentley et al. ................ | 348/143 |
| 2008/0318547 A1 * | 12/2008 | Ballou et al. .................. | 455/410 |
| 2009/0027495 A1 * | 1/2009 | Oskin et al. ................... | 348/143 |
| 2009/0085740 A1 * | 4/2009 | Klein et al. .................... | 340/540 |
| 2009/0189981 A1 * | 7/2009 | Siann et al. ................... | 348/143 |
| 2009/0265206 A1 * | 10/2009 | Friedlander et al. ............. | 705/9 |
| 2010/0141762 A1 * | 6/2010 | Siann et al. ................... | 348/143 |

FOREIGN PATENT DOCUMENTS

JP    2005-184387         7/2005
JP    2005184387 A  *    7/2005

* cited by examiner

*Primary Examiner* — Alina N. Boutah
(74) *Attorney, Agent, or Firm* — Fujitsu Patent Center

(57) ABSTRACT

A bandwidth control server, a bandwidth control program recorded on a computer readable record medium, and a monitoring system that control the sending of image data obtained by cameras in accordance with priority corresponding to a situation. A setting information storage section stores setting information regarding a camera installed at each point. When disaster information is acquired, a disaster detection section extracts a disaster type and a disaster area from the disaster information. A priority determination section searches the setting information on the basis of the disaster type and the disaster area and extracts setting information corresponding to the disaster type. Then the priority determination section determines priority for sending image data obtained by cameras installed in the disaster area on the basis of the extracted setting information. A bandwidth control section ensures bandwidths which can be used for sending the image data in descending order of the priority on the basis of the priority and bandwidth information acquired by a network monitoring section.

9 Claims, 21 Drawing Sheets

FIG. 5

210 RECEIVED DATA INFORMATION

| DATA TYPE | CONTENTS | DATA SENDING SOURCE | RECEIVED DATA FORMAT | DISASTER TYPE |
|---|---|---|---|---|
| ADVANCE DISASTER INFORMATION | EMERGENCY QUICK EARTHQUAKE ANNOUNCEMENT | EMERGENCY QUICK EARTHQUAKE ANNOUNCEMENT SERVER | BCH-FORMAT MESSAGE | EARTHQUAKE |
| | TIDAL WAVE INFORMATION | TIDAL WAVE INFORMATION SERVER | BCH-FORMAT MESSAGE | TIDAL WAVE |
| | WEATHER WATCH | WEATHER WATCH SERVER | XML-FORMAT DATA | FLOOD DISASTER |
| DISASTER OCCURRENCE INFORMATION | EARTHQUAKE INFORMATION | EARTHQUAKE INFORMATION SERVER | BCH-FORMAT MESSAGE | EARTHQUAKE |
| | VOLCANO INFORMATION | VOLCANO INFORMATION SERVER | BCH-FORMAT MESSAGE | VOLCANO |
| | RIVER INFORMATION | RIVER INFORMATION SERVER | BCH-FORMAT MESSAGE | FLOOD DISASTER |
| | ROAD INFORMATION | ROAD INFORMATION SERVER | BCH-FORMAT MESSAGE | TRAFFIC |
| | DAMAGE INFORMATION | DAMAGE INFORMATION SHARING SERVER | BCH-FORMAT MESSAGE | |
| ... | | | | |
| 211 | 212 | 213 | 214 | 215 |

220 SETTING INFORMATION

| DIS-ASTER TYPE | AREA | CAMERA NAME | NORMAL ADDRESS | MULTI-CAST AD-DRESS | IMAGE DATA PRI-ORITY | NECES-SARY BAND-WIDTH | CAMERA PO-SITION PRI-ORITY |
|---|---|---|---|---|---|---|---|
| EARTH-QUAKE | 4411 | NO. 1 AT POINT A | A | a | 1 | 6Mbps | 1 |
| | 4412 | NO. 2 AT POINT A | B | b | 5 | 1.5Mbps | 1 |
| | 4413 | NO. 3 AT POINT A | C | c | 4 | 384Kbps | 1 |
| | 4610 | NO. 1 AT POINT B | D | d | 2 | 1.5Mbps | 2 |
| | 4611 | NO. 2 AT POINT B | E | e | 6 | 384Kbps | 5 |
| | 0100 | NO. 1 AT POINT C | F | f | 3 | 1.5Mbps | 3 |
| TIDAL WAVE | 4411 | NO. 1 AT POINT A | A | a | 6 | 6Mbps | 2 |
| | 4412 | NO. 2 AT POINT A | B | b | 1 | 1.5Mbps | 2 |
| | 4413 | NO. 3 AT POINT A | C | c | 4 | 384Kbps | 2 |
| | 4610 | NO. 1 AT POINT B | D | d | 2 | 1.5Mbps | 1 |
| | 4611 | NO. 2 AT POINT B | E | e | 5 | 384Kbps | 5 |
| | 0100 | NO. 1 AT POINT C | F | f | 3 | 1.5Mbps | 3 |
| | | | | | | | |

230 CAMERA SETTING INFORMATION

| AREA | CAMERA NAME | CAMERA DIRECTION | | | |
|---|---|---|---|---|---|
| | | PRESET INFORMATION 1 | PRESET INFORMATION 2 | ... | PRESET INFORMATION n |
| 4411 | NO. 1 AT POINT A | 20.40.60 (A INTERSECTION) | 50.190.99 (A SECTION) | | |
| 4412 | NO. 2 AT POINT A | 10.40.90 (LOWER TAMA RIVER) | 10.40.60 (TOKYO BAY) | | |
| 4413 | NO. 3 AT POINT A | 90.40.60 (SHELTER IN SECTION) | 80.40.60 (B SHELTER IN COASTAL AREA) | | |
| 4610 | NO. 1 AT POINT B | 20.40.60 (B INTERSECTION) | 50.190.99 (B SECTION) | | |
| 4611 | NO. 2 AT POINT B | 10.40.90 (UPPER TSURUMI RIVER) | 10.40.60 (LOWER TSURUMI RIVER) | | |
| 0100 | NO. 1 AT POINT C | 20.40.60 (C INTERSECTION) | 50.190.99 (C SECTION) | | |
| | | | | | |
| 231 | 232 | 233 | 234 | | 235 |

FIG. 7

420 DISASTER STATE DATABASE (EARTHQUAKE)

| AREA | CAMERA NAME | DIS-ASTER TYPE | SE-LECTION | IP AD-DRESS | PRI-ORITY | NECES-SARY BAND-WIDTH | CAMERA PO-SITION | CAMERA DIRECTION | |
|---|---|---|---|---|---|---|---|---|---|
| | | | | | | | | PRESET INFORMATION 1 | PRESET INFORMATION 2 |
| 4411 | NO. 1 AT POINT A | EARTH-QUAKE | ○ | a | 1 | 6Mbps | 1 | 20.40.60 (A INTERSECTION) | 50.190.99 (A SECTION) |
| 4412 | NO. 2 AT POINT A | EARTH-QUAKE | ○ | b | 3 | 1.5Mbps | 1 | 10.40.90 (LOWER TAMA RIVER) | 10.40.60 (TOKYO BAY) |
| 4413 | NO. 3 AT POINT A | EARTH-QUAKE | ○ | c | 2 | 384Kbps | 1 | 90.40.60 (SHELTER IN SECTION) | 80.40.60 (B SHELTER IN COASTAL AREA) |
| 4610 | NO. 1 AT POINT B | NORMAL STATE | | D | 4 | 1.5Mbps | 2 | 20.40.60 (B INTERSECTION) | 50.190.99 (B SECTION) |
| 4611 | NO. 2 AT POINT B | NORMAL STATE | | E | 6 | 384Kbps | 5 | 10.40.90 (UPPER TSURUMI RIVER) | 10.40.60 (LOWER TSURUMI RIVER) |
| 0100 | NO. 1 AT POINT C | NORMAL STATE | | F | 5 | 1.5Mbps | 3 | 20.40.60 (C INTERSECTION) | 50.190.99 (C SECTION) |
| | | | | | | | | | |

430 DISASTER STATE DATA BASE (TIDAL WAVE)

| AREA | CAMERA NAME | DISASTER TYPE | SELECTION | IP ADDRESS | PRIORITY | NECESSARY BANDWIDTH | CAMERA POSITION | CAMERA DIRECTION | |
|---|---|---|---|---|---|---|---|---|---|
| | | | | | | | | PRESET INFORMATION 1 | PRESET INFORMATION 2 |
| 4411 | NO. 1 AT POINT A | TIDAL WAVE | ○ | a | 3 | 6Mbps | 2 | 20.40.60 (A INTERSECTION) | 50.190.99 (A SECTION) |
| 4412 | NO. 2 AT POINT A | TIDAL WAVE | ○ | b | 1 | 1.5Mbps | 2 | 10.40.90 (LOWER TAMA RIVER) | 10.40.60 (TOKYO BAY) |
| 4413 | NO. 3 AT POINT A | TIDAL WAVE | ○ | c | 2 | 384Kbps | 2 | 90.40.60 (SHELTER IN SECTION) | 80.40.60 (B SHELTER IN COASTAL AREA) |
| 4610 | NO. 1 AT POINT B | NORMAL STATE | | D | 4 | 1.5Mbps | 1 | 20.40.60 (B INTERSECTION) | 50.190.99 (B SECTION) |
| 4611 | NO. 2 AT POINT B | NORMAL STATE | | E | 6 | 384Kbps | 5 | 10.40.90 (UPPER TSURUMI RIVER) | 10.40.60 (LOWER TSURUMI RIVER) |
| 0100 | NO. 1 AT POINT C | NORMAL STATE | | F | 5 | 1.5Mbps | 3 | 20.40.60 (C INTERSECTION) | 50.190.99 (C SECTION) |

500 CAMERA SELECTION SCREEN

| SE-LECTION | CAMERA NAME | DISASTER STATE | DISASTER TYPE | CAMERA DIRECTION | REMARK |
|---|---|---|---|---|---|
| ○ | NO. 1 AT POINT A | DISASTER | FLOOD DISASTER | KAWASAKI INTERSECTION | |
| ○ | NO. 2 AT POINT A | DISASTER | FLOOD DISASTER | UPPER TAMA RIVER | CYCLIC PROCESS (NO. 2→NO. 3 IS REPEATED) |
| ○ | NO. 3 AT POINT A | DISASTER | FLOOD DISASTER | KAWASAKI SHELTER | |
| | NO. 1 AT POINT B | NORMAL STATE | - | YOKOHAMA INTERSECTION | |
| | NO. 2 AT POINT B | NORMAL STATE | - | LOWER TSURUMI RIVER | |
| | NO. 1 AT POINT C | NORMAL STATE | - | TSURUMI INTERSECTION | |

BANDWIDTH CONTROL SERVER, COMPUTER READABLE RECORD MEDIUM ON WHICH BANDWIDTH CONTROL PROGRAM IS RECORDED, AND MONITORING SYSTEM

CROSS-REFERENCE TO RELATED APPLICATIONS

This application is based upon and claims the benefits of priority from the prior Japanese Patent Application No. 2008-028741, filed on Feb. 8, 2008, the entire contents of which are incorporated herein by reference.

BACKGROUND OF THE INVENTION

1. Field of the Invention

This invention relates to a bandwidth control server, a bandwidth control program recorded on a computer readable record medium, and a monitoring system and, more particularly, to a bandwidth control server and a bandwidth control program recorded on a computer readable record medium which are connected to a plurality of cameras via a network for controlling the sending of camera image data according to a bandwidth of the network, and a monitoring system for acquiring image data obtained by a plurality of cameras and for performing centralized monitoring of a situation.

2. Description of the Related Art

A monitoring system for receiving image data obtained by a plurality of cameras installed at a remote place (for example, by a river) via a network and for performing centralized monitoring of a situation at the remote place is known. If a failure occurs in a main line usually used in such a monitoring system, then switching from the main line to a subline is performed to transfer image data.

However, when switching from a wide-band main line to a narrow-band subline is performed to send or receive image data, all camera image data cannot be sent or received because of bandwidth limitation. If a network bandwidth is limited in this way, the following problem arises. If it is necessary to immediately acquire, for example, information regarding damage caused in an area where a disaster has occurred, it is possible that such information cannot be received. Accordingly, an image bypass control server for permitting the sending of image data in descending order of priority on the basis of priority assigned in advance to each camera in the case of the occurrence of a failure in a main line is proposed (see, for example, Japanese Patent Laid-Open Publication No. 2005-184387 (FIG. 1)). In addition, when notice of a disaster is sent from a camera, this image bypass control server performs switching in order to preferentially acquire image data from the camera from which the notice of a disaster is sent.

With the conventional image bypass control, however, it is difficult to make each camera send image data in accordance with priority corresponding to a situation at each moment.

Camera priority at the time of the occurrence of a disaster is not always fixed and changes according to the type of the disaster. For example, if a heavy rain warning is issued, then the priority of an image obtained by a camera used for taking the upper waters of a river should be raised in order to monitor the conditions of a landslide or a flood. On the other hand, if a tidal wave warning is issued, then the priority of an image obtained by a camera used for taking a coastline should be raised in order to monitor the conditions of the coastline. Priority changes in this way according to a situation at each moment. If priority is fixed, it is impossible to flexibly acquire image data according to a change in conditions. As a result, it is possible that image data for a point that is the most important at that point of time cannot be obtained automatically.

In addition, a camera which detects a disaster and which sends notice of the disaster sends image data preferentially. However, a bandwidth is assigned in accordance with fixed priority until the notice of the disaster is received. Accordingly, even if a sign is detected before the occurrence of the disaster and a warning is issued, it is impossible to comply with a request to monitor conditions in an area over which the warning is issued. In such a case, manual switching must be performed. This is inconvenient.

SUMMARY OF THE INVENTION

The present invention was made under the background circumstances described above. An object of the present invention is to provide a bandwidth control server, a bandwidth control program recorded on a computer readable record medium, and a monitoring system for setting priority according to a situation at each moment and for controlling a bandwidth used for sending image data.

In order to achieve the above object, a bandwidth control server which is connected to a plurality of cameras via a network and which controls the sending of image data obtained by the plurality of cameras according to a bandwidth of the network is provided. This bandwidth control server comprises a disaster detection section for acquiring disaster information issued at the time of a disaster being detected and for detecting a disaster type and a disaster area included in the disaster information, a priority determination section for extracting setting information corresponding to the specified disaster type from setting information regarding the plurality of cameras which is stored in a setting information storage section and which includes points at which the plurality of cameras are installed, a bandwidth required to send the image data, and image data priority corresponding to the disaster type and for determining priority among cameras installed in the disaster area on the basis of the image data priority defined in the extracted setting information corresponding to the disaster type, a network monitoring section for monitoring a state of the network and for acquiring bandwidth information including a bandwidth which can be used for transferring the image data, and a bandwidth control section for ensuring bandwidths required to send image data obtained by the cameras from among the usable bandwidth of the network which is set in the bandwidth information in descending order of the priority on the basis of the priority among the cameras and for giving the cameras for which the bandwidths are ensured instructions to send the image data.

In addition, in order to achieve the above object, a monitoring system for acquiring image data obtained by a plurality of cameras and for performing centralized monitoring of a situation is provided. This monitoring system comprises a disaster information offer server for detecting the occurrence of a predetermined disaster or a sign of a predetermined disaster, for generating disaster information including a disaster type for specifying the predetermined disaster and disaster area information for specifying a disaster area influenced by the predetermined disaster, and for sending the disaster information in response to a request; cameras connected to a network for sending image data obtained by taking a designated direction via the network; a bandwidth control server including a disaster detection section for acquiring disaster information issued at the time of a disaster being detected and for detecting a disaster type and a disaster area included in the disaster information, a priority determination section for extracting setting information corresponding to the specified disaster type from setting information regarding the cameras which is stored in a setting information storage section and which includes points at which the cameras are installed, a bandwidth required to send the image data, and image data priority according to disaster type and for determining priority among cameras installed in the disaster area on the basis of the image data priority defined in the extracted setting information corresponding to the disaster type, a network monitoring section for monitoring a state of the network and for acquiring bandwidth information including a bandwidth which can be used for transferring the image data, and a bandwidth control section for ensuring bandwidths required to send image data obtained by the cameras from among the usable bandwidth of the network which is set in the bandwidth information in descending order of the priority on the basis of the priority among the cameras and for giving the cameras for which the bandwidths are ensured instructions to send the image data; and a monitoring unit connected to the cameras via the network for receiving and accumulating the image data sent by the plurality of cameras and for displaying the image data on a display unit.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a view showing an example of received data information.

FIG. 6 is a view showing an example of setting information.

FIG. 7 is a view showing an example of camera setting information.

FIG. 13 is a view showing an example of a disaster state database at the time of the occurrence of a disaster (earthquake).

FIG. 14 is a view showing an example of a disaster state database at the time of the occurrence of a disaster (tidal wave).

FIG. 19 is a view showing an example of a camera selection screen displayed at the time of a cyclic process being performed.

DESCRIPTION OF THE PREFERRED EMBODIMENTS

Figure 1:
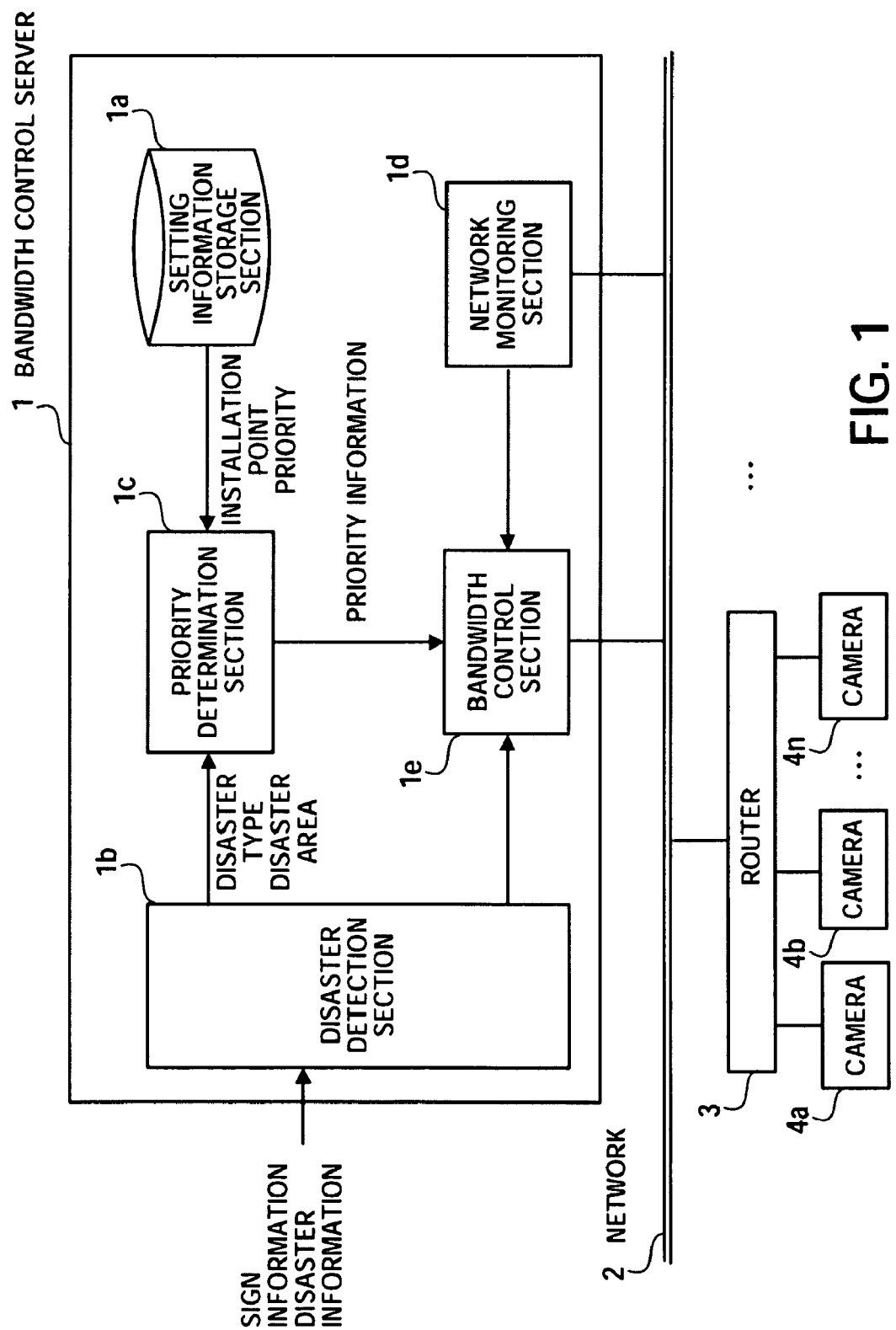
FIG. 1 is a schematic view of the present invention applied to embodiments.

FIG. 1 is a schematic view of the present invention applied to embodiments. A bandwidth control server 1 according to the present invention acquires image data obtained by cameras 4a, 4b, . . . , and 4n installed at various points via a network 2, and makes a monitoring unit (not shown) display video based on the image data acquired. The bandwidth control server 1 is applied to a monitoring system which can perform centralized monitoring of a situation at each point.

A network 2 includes a main line having a great bandwidth and a subline having a small bandwidth. When a failure occurs in the main line, the image data is sent via the subline. A bandwidth corresponds to a bit rate which can be transferred, and is expressed in bits/second (bps). A network having a greater bandwidth can carry a larger amount of data. The cameras 4a, 4b, . . . , and 4n are connected to the network 2 via a router 3 and send image data obtained in accordance with instructions from the bandwidth control server 1 and the monitoring unit (not shown).

The bandwidth control server 1 comprises a setting information storage section 1a for storing camera setting information, a disaster detection section 1b for acquiring disaster information issued for giving notice of a disaster or a sign thereof, a priority determination section 1c for determining image data priority, a network monitoring section 1d for monitoring the state of the network 2, and a bandwidth control section 1e for controlling a bandwidth.

The setting information storage section 1a stores setting information regarding a camera installed at each point. The setting information includes basic camera information such as a camera installation point at which each camera is installed, identification data for each camera, and a bandwidth required to transfer image data obtained by each camera. In addition, the setting information includes image data priority corresponding to the disaster type of a disaster which has occurred and information for specifying camera operation, such as the direction of each camera, at the time of the occurrence of the disaster.

The disaster detection section 1b acquires disaster information issued at the time of a disaster being detected and specifies the disaster type and the disaster area of the disaster detected on the basis of the disaster information acquired. The disaster detection section 1b acquires a quick earthquake announcement, a weather warning or watch, tidal wave information, or the like issued by the proper authorities or a self-governing community as the disaster information. The disaster information includes disaster occurrence information regarding a disaster which has occurred and advance disaster information regarding a disaster which has not occurred yet and a sign of which has been detected or regarding a disaster the occurrence of which is forecast from current conditions. If there is no special need to distinguish the disaster occurrence information from the advance disaster information, the term "disaster information" will be used. This disaster information includes information regarding a disaster type and a disaster area in which a disaster has occurred or in which the occurrence of a disaster is forecast. The disaster detection section 1b specifies the disaster type and the disaster area on the basis of the disaster information acquired and sends the disaster type and the disaster area to the priority determination section 1c.

The priority determination section 1c searches the setting information stored in the setting information storage section 1a with the disaster type sent from the disaster detection section 1b as a key. The priority determination section 1c compares a camera installation point defined in extracted setting information corresponding to the disaster type with the disaster area specified on the basis of the disaster information and specifies a camera installed in the disaster area. Then the priority determination section 1c determines priority for sending image data obtained by each camera on the basis of image data priority defined in the extracted setting information corresponding to the disaster type. The priority determination section 1c informs the bandwidth control section 1e of the determined priority as priority information.

The network monitoring section 1d monitors the state of the network 2 to which each camera is connected, obtains a bandwidth which can be used for transferring image data, and generates bandwidth information. The network 2 has the main line and the backup subline. When a failure occurs in the main line, data can be transferred by performing switching to the subline. However, the subline has a smaller bandwidth than the main line, so the number of cameras from which image data can be transferred is limited. Accordingly, there is need to obtain a bandwidth which can be used for transferring image data under the current conditions of the network 2. Band information generated is sent to the bandwidth control section 1e.

The bandwidth control section 1e ensures for each camera a bandwidth required to send image data in descending order of priority for sending image data on the basis of the priority information and the bandwidth information. For example, the bandwidth control section 1e compares a bandwidth which is obtained from the bandwidth information and which can be used for transferring image data with a bandwidth required to send image data obtained by a highest priority camera. If image data obtained by the highest priority camera can be sent, then the bandwidth control section 1e ensures a bandwidth required to send image data obtained by the highest priority camera. When the bandwidth is ensured, image data can always be sent from this camera. As a result, a bandwidth obtained by subtracting the bandwidth required to send image data obtained by this camera from the usable bandwidth can be used. The same process is performed for a next highest priority camera. A process for ensuring a bandwidth for each camera is repeated in this way until bandwidths are ensured for all of the cameras or until a usable bandwidth is used up. Instructions to send image data are given to each camera for which a bandwidth is ensured. If it is impossible to ensure for all of the cameras bandwidths required to send image data, then a bandwidth which can be ensured may be used in turn as a shared bandwidth. A shared bandwidth is a bandwidth assigned to a lowest priority camera of bandwidths ensured for cameras. For example, it is assumed that the camera 4a is the highest priority camera and that priority is set in the order of the cameras 4b, 4c, . . . , and 4n. If bandwidths required to send image data obtained by the cameras 4a and 4b can be ensured and bandwidths required to send image data obtained by the cameras 4c, . . . , and 4n cannot be ensured, then the bandwidth ensured for the camera 4b which is a lower priority camera of the cameras 4a and 4b for which a bandwidth is ensured is used by the cameras 4b, 4c, . . . , and 4n as a shared bandwidth. Image data obtained by the camera 4b is sent for a certain period of time. After that, the sending of image data obtained by the camera 4b is stopped and the free shared bandwidth is assigned for sending image data obtained by the camera 4c that is the highest priority camera of the cameras for which a bandwidth is not ensured yet. After the elapse of a certain period of time the sending of the image data obtained by the camera 4c is stopped. The free shared bandwidth is assigned to a next highest priority camera. This process is repeated in turn. Even if a bandwidth cannot be ensured, image data obtained by the plurality of cameras can be sent by cyclically assigning the shared bandwidth in this way.

Operation and a bandwidth control method performed by the bandwidth control server 1 having the above structure will be described.

The bandwidth control server 1 controls the sending of image data obtained by the cameras 4a, 4b, . . . , and 4n connected thereto via the network 2 according to a bandwidth of the network 2 the network monitoring section 1d acquires. In addition, the setting information storage section 1a stores in advance setting information such as a camera installation point at which each camera is installed, a bandwidth required to send image data obtained by each camera, image data priority corresponding to a disaster type, and the direction of each camera at the time of the occurrence of a disaster.

When disaster information is issued and is acquired by the bandwidth control server 1, the disaster detection section 1b specifies a disaster type and a disaster area on the basis of the disaster information acquired. The priority determination section 1c searches setting information on the basis of the disaster type specified and extracts camera setting information corresponding to the disaster type. Then the priority determination section 1c sets priority for sending image data obtained by each camera installed in the disaster area on the basis of image data priority defined in the extracted setting information and generates priority information. The bandwidth control section 1e ensures for each camera a bandwidth required to send image data from among a usable bandwidth obtained by the network monitoring section 1d in descending order of priority. Instructions to send image data are given to each camera for which a bandwidth is ensured. A bandwidth of the network 2 is ensured in this way in accordance with the priority until bandwidths required to send image data obtained by all of the cameras 4a, 4b, . . . , 4n are ensured or until a bandwidth of the network 2 cannot be ensured. If a bandwidth is shared by a plurality of cameras, instructions to send image data are given to these cameras in turn in a constant cycle.

When a disaster has occurred, the above process is performed. By doing so, bandwidths required to send the most important image data are preferentially ensured according to the type of the disaster. As a result, necessary image data can be obtained according to conditions. Furthermore, a disaster is also detected on the basis of advance disaster information obtained before the occurrence thereof. Accordingly, image data obtained by each camera installed at a necessary point can preferentially be acquired before the occurrence of the disaster.

In addition, if all bandwidths that are required to send image data cannot be ensured, a bandwidth ensured for the lowest priority camera of bandwidths ensured is used in turn.

Image data obtained by lower priority cameras can also be acquired by doing so, but an update cycle becomes long. As a result, all image data can be acquired.

Embodiments of the present invention will now be described in detail with reference to the drawings. A monitoring system according to an embodiment of the present invention displays image data obtained by cameras dispersedly located on an internet protocol (IP) network on a predetermined monitor and performs centralized monitoring of the state of a remote place.

Figure 2:
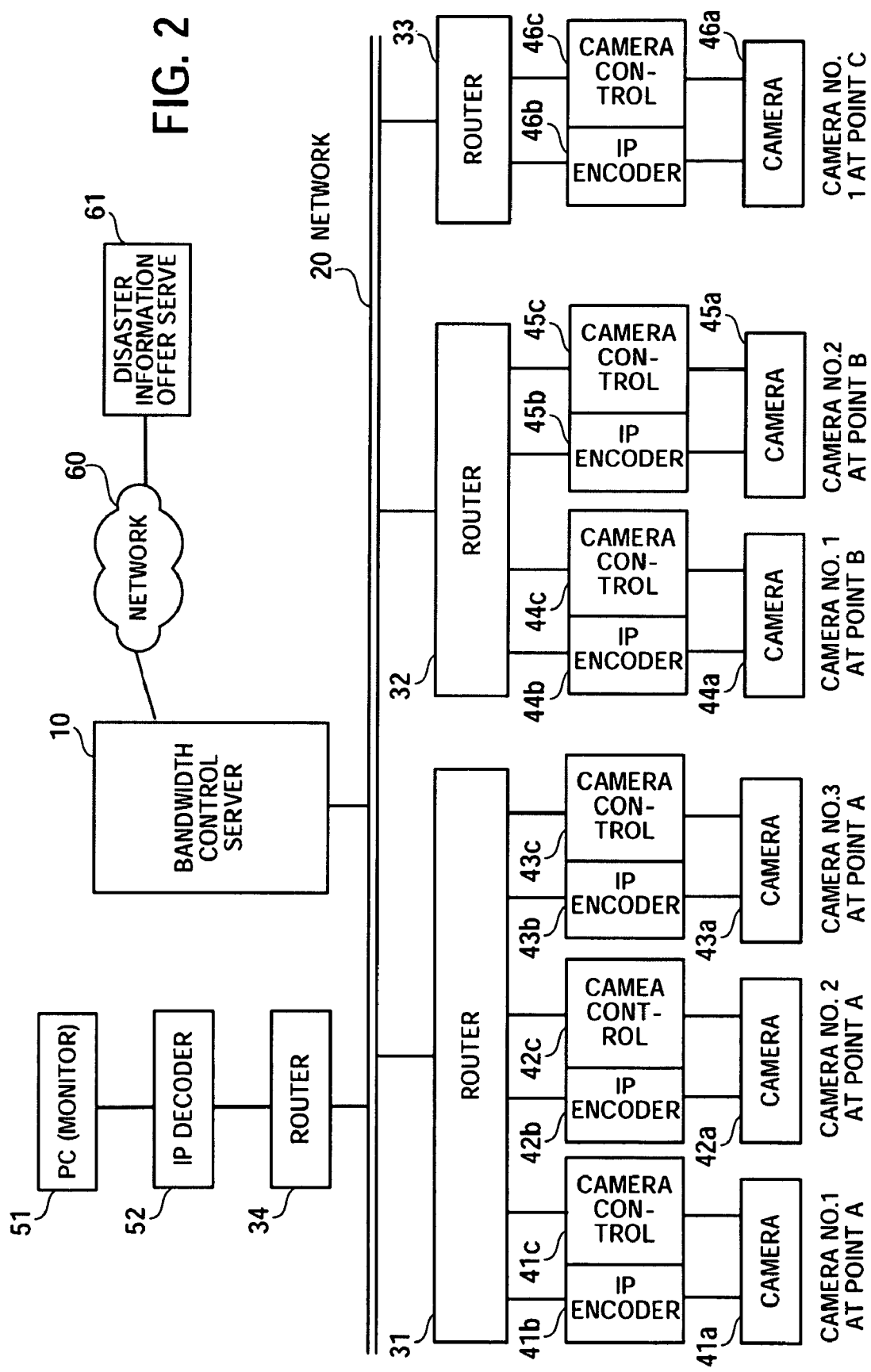
FIG. 2 is a view showing the structure of a monitoring system according to an embodiment of the present invention.

FIG. 2 is a view showing the structure of a monitoring system according to an embodiment of the present invention.

With a monitoring system according to an embodiment of the present invention a bandwidth control server 10, a router 34 connected to a personal computer (PC) 51 with a monitor for monitoring image data via an IP decoder 52, a router 31 which is located at a point A and which is connected to cameras 41a, 42a, and 43a via IP encoders 41b, 42b, and 43b respectively, a router 32 which is located at a point B and which is connected to cameras 44a and 45a via IP encoders 44b and 45b respectively, and a router 33 which is located at a point C and which is connected to a camera 46a via an IP encoder 46b are connected to a network 20. In addition, a disaster information offer server 61 for offering disaster information is connected to the bandwidth control server 10 via a network 60. The same network may be used as the network 20 and the network 60.

The bandwidth control server 10 monitors the state of the network 20, determines priority for sending image data obtained by each camera on the basis of the state of the network 20 and disaster information acquired from the disaster information offer server 61, and controls a bandwidth used for sending the image data.

The network 20 includes a main line having a great bandwidth and a subline having a small bandwidth. Usually image data of each point is sent to the PC 51 via the main line. When a failure occurs in the main line, image data is sent by performing switching to the subline.

The cameras 41a, 42a, and 43a are connected to the router 31 located at the point A via the IP encoders 41b, 42b, and 43b, respectively, for encoding and compressing obtained image data for sending. In addition, camera controls 41c, 42c, and 43c for controlling a direction to be taken and the like are connected to the cameras 41a, 42a, and 43a respectively. A direction designated by the camera control 41c is taken by the camera 41a and image data obtained is sent to the PC 51 via the IP encoder 41b. The same process is performed with the other cameras. A name is given to each camera as identification data for identifying individual cameras. For example, the camera 41a is named "Camera No. 1 at point A," the camera 42a is named "Camera No. 2 at point A," and the camera 43a is named "Camera No. 3 at point A".

The cameras 44a and 45a are connected to the router 32 located at the point B via the IP encoders 44b and 45b respectively. In addition, camera controls 44c and 45c for controlling a camera direction and the like are connected to the cameras 44a and 45a respectively. The camera 44a is named "Camera No. 1 at point B" and the camera 45a is named "Camera No. 2 at point B".

The camera 46a is connected to the router 33 located at the point C via the IP encoder 46b. In addition, a camera control 46c is connected to the camera 46a. The camera 46a is named "Camera No. 1 at point C".

The PC 51 is connected to the router 34 via the IP decoder 52. The PC 51 is a monitoring unit which receives image data obtained by a camera installed at each point, which stores and manages the image data, and which displays image data for an arbitrary point on a monitor.

Figure 3:
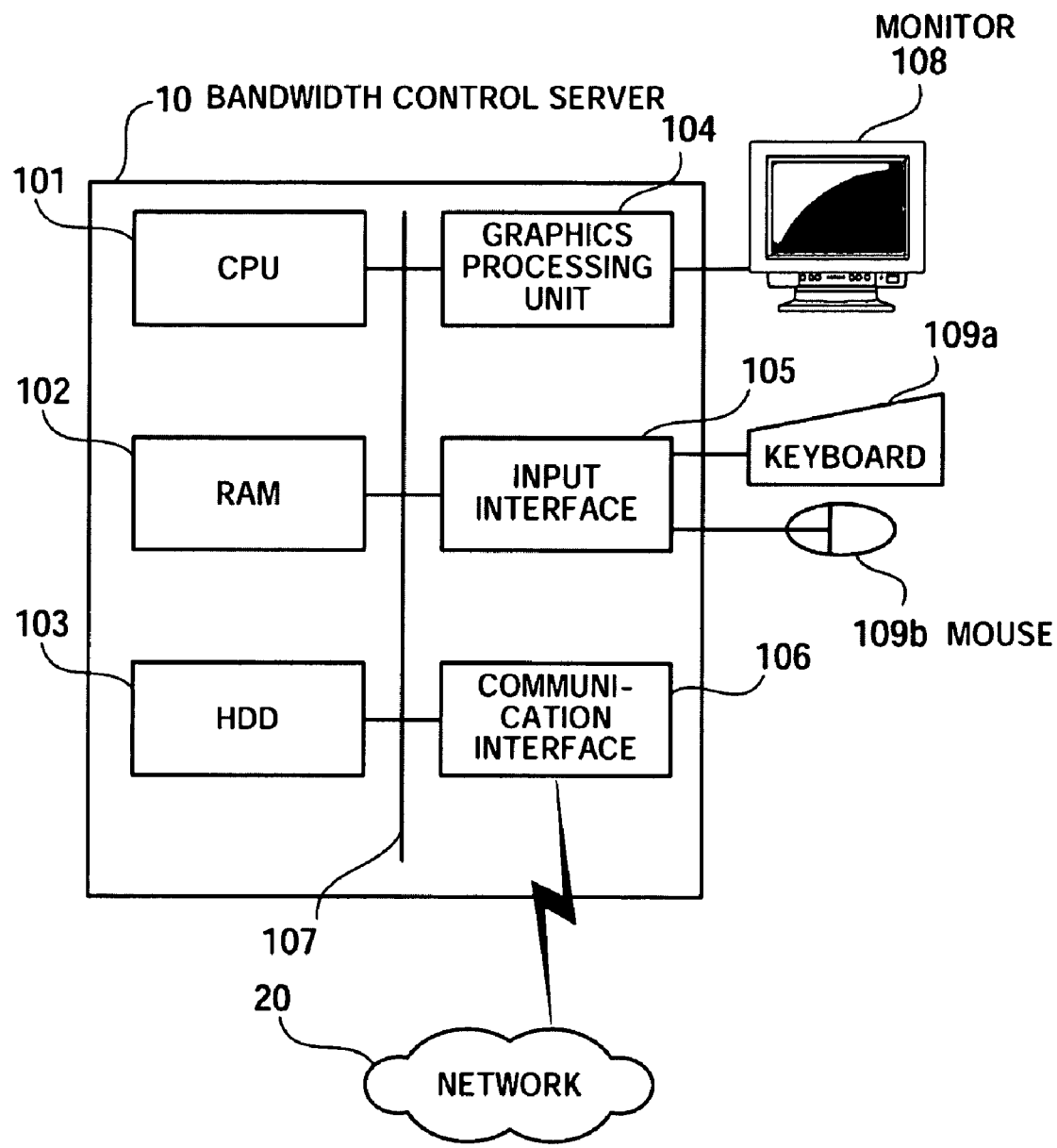
FIG. 3 is a block diagram showing an example of the hardware configuration of a bandwidth control server.

The hardware configuration of the bandwidth control server will now be described. FIG. 3 is a block diagram showing an example of the hardware configuration of a bandwidth control server.

The whole of the bandwidth control server 10 is controlled by a central processing unit (CPU) 101. A random access memory (RAM) 102, a hard disk drive (HDD) 103, a graphics processing unit 104, an input interface 105, and a communication interface 106 are connected to the CPU 101 via a bus 107.

The RAM 102 temporarily stores at least part of an operating system (OS) or an application program executed by the CPU 101. The RAM 102 also stores various pieces of data which the CPU 101 needs to perform a process. The HDD 103 stores the OS and application programs. A monitor 108 is connected to the graphics processing unit 104. In accordance with instructions from the CPU 101, the graphics processing unit 104 displays an image on a screen of the monitor 108. A keyboard 109a and a mouse 109b are connected to the input interface 105. The input interface 105 sends a signal sent from the keyboard 109a or the mouse 109b to the CPU 101 via the bus 107. The communication interface 106 is connected to the network 20 via a router (not shown) and receives image data sent from a camera via the network 20. The monitor 108, the keyboard 109a, the mouse 109b, and the like may be connected via the network 20.

By adopting the above hardware configuration, a processing function according to this embodiment of the present invention can be realized. In FIG. 3, the hardware configuration of the bandwidth control server 10 is shown. The hardware configuration of the PC 51 is the same as the hardware configuration of the bandwidth control server 10.

Figure 4:
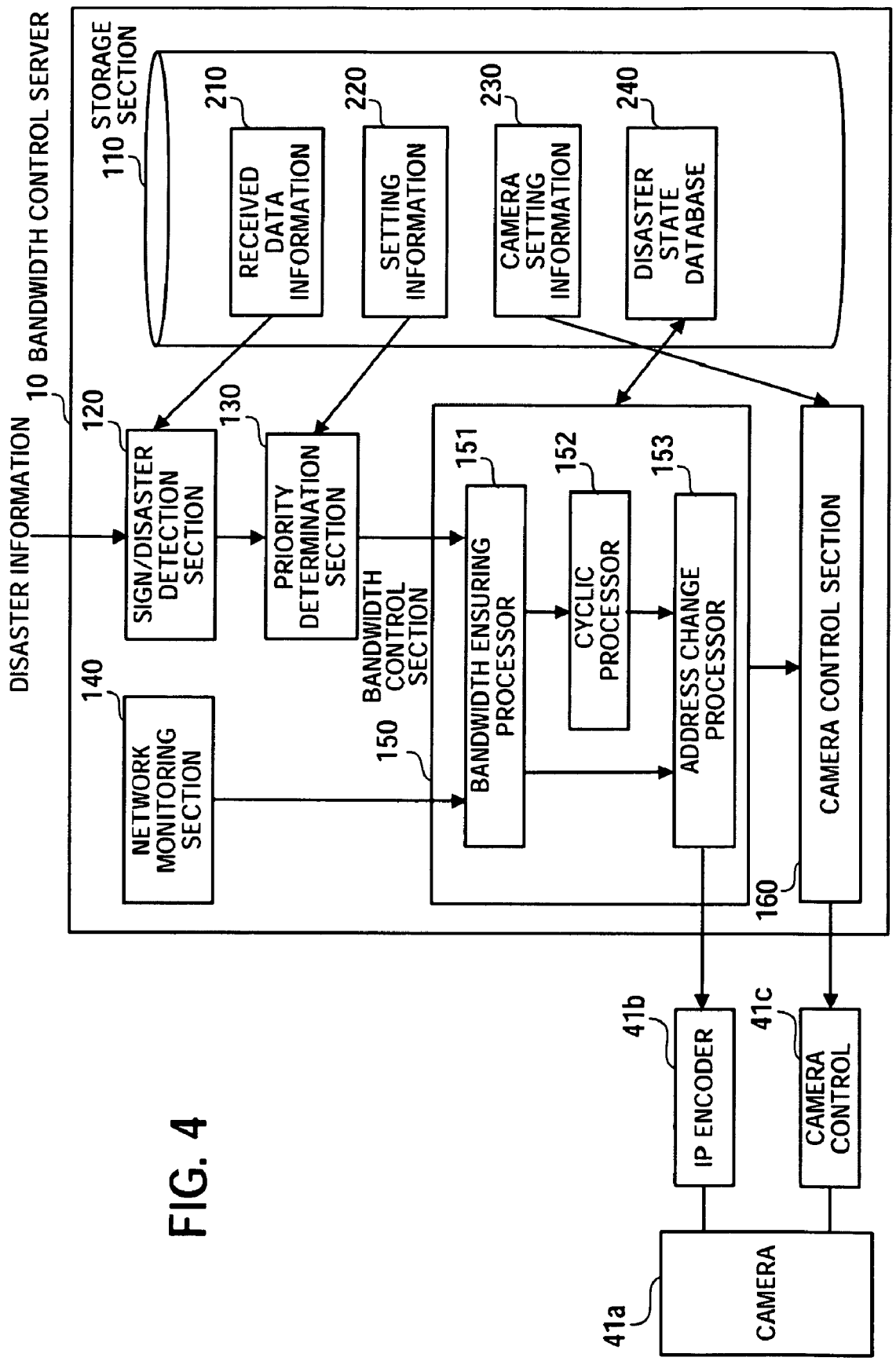
FIG. 4 is a view showing an example of the software configuration of the bandwidth control server.

The software configuration of the bandwidth control server will now be described. FIG. 4 is a view showing an example of the software configuration of the bandwidth control server. The bandwidth control server 10 comprises a storage section 110, a sign/disaster detection section 120, a priority determination section 130, a network monitoring section 140, a bandwidth control section 150, and a camera control section 160.

The storage section 110 stores received data information 210, setting information 220, camera setting information 230, and a disaster state database 240. The details of the file structure of each piece of information will be given later.

The sign/disaster detection section 120 detects a disaster. The sign/disaster detection section 120 detects a disaster regarding the cameras managed by the bandwidth control server 10 on the basis of disaster occurrence information or advance disaster information acquired from the disaster information offer server 61. The format of disaster information (including disaster occurrence information and advance disaster information) depends on which issues it, but at least a disaster type and a disaster area are set. Accordingly, the sign/disaster detection section 120 obtains in advance file format information required to extract necessary information, and extracts the disaster type and the disaster area from the disaster information acquired. If necessary, the sign/disaster detection section 120 converts a description format into the format of the setting information 220 to specify the disaster type and the disaster area.

If bandwidths required to send image data obtained by cameras installed in the disaster area in which a disaster is detected cannot be ensured, then the priority determination section 130 determines image data priority on the basis of priority set in the setting information 220. The priority is set according to disaster type. The priority determination section 130 determines image data priority on the basis of priority corresponding to the disaster type specified.

The network monitoring section 140 monitors the state of the network 20 and measures a bandwidth of the network 20 which can be used for transferring the image data. The measured bandwidth is set in bandwidth information and is sent to the bandwidth control section 150.

The bandwidth control section 150 includes a bandwidth ensuring processor 151, a cyclic processor 152, and an address change processor 153. If bandwidths required to send the image data obtained by all of the cameras installed in the disaster area cannot be ensured, then the bandwidth ensuring processor 151 ensures bandwidths required to send the image data in descending order of camera priority and makes each camera begin sending image data. A process is repeated until bandwidths required to send the image data obtained by all of the cameras are ensured. If the bandwidths required to send the image data obtained by all of the cameras cannot be ensured, then the cyclic processor 152 exercises control at need so that a plurality of cameras will use an ensured bandwidth in turn. The address change processor 153 gives notice of an address used by a camera for which a bandwidth is ensured. In this embodiment, a camera for which a bandwidth is ensured performs multicast sending. The address change processor 153 informs a corresponding IP encoder and router of a multicast address used.

On the basis of the camera setting information 230, the camera control section 160 gives the camera control 41c instructions regarding a direction to be taken in order to preset the camera.

Information stored in the storage section 110 will now be described.

FIG. 5 is a view showing an example of received data information. Received data information 210 is information for receiving disaster information and includes the items of Data Type 211, Contents 212, Data Sending Source 213, Received Data Format 214, and Disaster Type 215.

The Data Type 211 is data which indicates that disaster information acquired is "advance disaster information" issued at the time of a sign being detected before the occurrence of a disaster or "disaster occurrence information" issued at the time of the occurrence of a disaster being detected. The Contents 212 are the name of the disaster information acquired and are data which indicates the contents of the disaster information acquired. The Data Sending Source 213 is data which indicates an issuance source that issues and sends the disaster information. A data sending source corresponds to the disaster information offer server 61. The disaster information is registered on the data sending source so that it will be sent from the data sending source at the time of the disaster being detected. The disaster information may be acquired by inquiring of the data sending source in a predetermined cycle. The Received Data Format 214 is data which indicates the data format of the disaster information received. The Disaster Type 215 is data which defines a disaster type at the time of the disaster information being acquired. For example, an "emergency quick earthquake announcement" is "advance disaster information" notice of which is given before the occurrence of an earthquake, and is sent from an "emergency quick earthquake announcement server". A data format is a "BCH-format message" and a disaster type is an "earthquake".

The sign/disaster detection section 120 recognizes the contents of disaster information received from the disaster information offer server 61 registered in the Data Sending Source 213 on the basis of the received data information 210. Then the sign/disaster detection section 120 extracts a received data format and a disaster type corresponding to the contents recognized.

FIG. 6 is a view showing an example of the setting information. The setting information 220 is setting information regarding the cameras installed and includes the items of Disaster type 221, Area 222, Camera Name 223, Normal Address 224, Multicast Address 225, Image Data Priority 226, Necessary Bandwidth 227, and Camera Position Priority 228. The Disaster type 221 is information indicative of the type of a disaster and corresponds to the Disaster Type 215 included in the received data information 210. Setting information regarding the cameras is given according to disaster type. In the example shown in FIG. 6, setting information is given for the disaster types of an "earthquake" and a "tidal wave". The Area 222 is data indicative of an area in which each camera is installed. The Camera Name 223 is a name for identifying each camera installed. The Normal Address 224 is an address used by each camera for sending image data in a normal state. The Multicast Address 225 is an address used for multicast sending in the case of, for example, preferentially ensuring a bandwidth at the time of the occurrence of a disaster. The Image Data Priority 226 is the priority of image data obtained by each camera at the time of the occurrence of a disaster of a corresponding disaster type. The Necessary Bandwidth 227 is a bandwidth required by each camera to send image data. The Camera Position Priority 228 is a direction to be taken by each camera at the time of the occurrence of a disaster of a corresponding disaster type. The details of the Camera Position Priority 228 will be given later.

The following is defined in, for example, a first line corresponding to each of the "earthquake" and the "tidal wave" in the Disaster type 221. A camera having the name "No. 1 at Point A" is installed in the area "4411," uses the address "A" at the time of normal data sending, uses the address "a" at the time of multicast sending, and requires a bandwidth of "6 Mbps" to send image data. When a disaster type is the "earthquake," the image data priority of the camera having the name "No. 1 at Point A" is "1" and "1" is set as a direction to be taken by the camera having the name "No. 1 at Point A". However, when a disaster type is the "tidal wave," the image data priority of the camera having the name "No. 1 at Point A" is "6" and "2" is set as a direction to be taken by the camera having the name "No. 1 at Point A". Image data priority and a direction to be taken can arbitrarily be set in this way according to disaster type. The setting information 220 is an example. Any form may be adopted so long as the same items are defined.

The priority determination section 130 reads out image data priority for each camera installed in a disaster area according to a disaster type set in disaster information received, and determines priority for sending image data obtained by each camera.

FIG. 7 is a view showing an example of the camera setting information. The camera setting information 230 is setting information regarding a direction to be taken by each camera installed, and includes the items of Area 231, Camera Name 232, and Camera Direction. The Area 231 and the Camera Name 232 are the same as the Area 222 and the Camera Name 223, respectively, included in the setting information 220. The Camera Direction is information for designating a direction to be taken by each camera. A plurality of directions, that is to say, preset information 1 (233), 2 (234), . . . , n (235) can be set. A preset information number indicative of a camera direction corresponds to a value set in the Camera Position Priority 228 included in the setting information 220. For example, when the "earthquake" has occurred, the camera position priority of the camera having the name "No. 1 at Point A" is "1". This means that a direction indicated by the preset information 1 is selected. The camera setting information 230 may be included in the setting information 220.

The above received data information 210, setting information 220, and camera setting information 230 are set in advance and are stored in the storage section 110.

The disaster state database 240 is information which is generated when the bandwidth control server 10 performs a process. The details of the disaster state database 240 will be given after the operation of the bandwidth control server 10 is described.

The operation of the bandwidth control server 10 will now be described.

When the occurrence of or a sign of a disaster is detected, the disaster information offer server 61 issues disaster information including disaster occurrence information or advance disaster information. When the disaster information is sent from the disaster information offer server 61, the sign/disaster detection section 120 of the bandwidth control server 10 analyzes the received disaster information and acquires, at the least, a disaster type and a disaster area. The format of the disaster information depends on the disaster information offer server 61 which is an issuance source. The sign/disaster detection section 120 specifies the disaster information issued and extracts information in accordance with the format.

Figure 8:
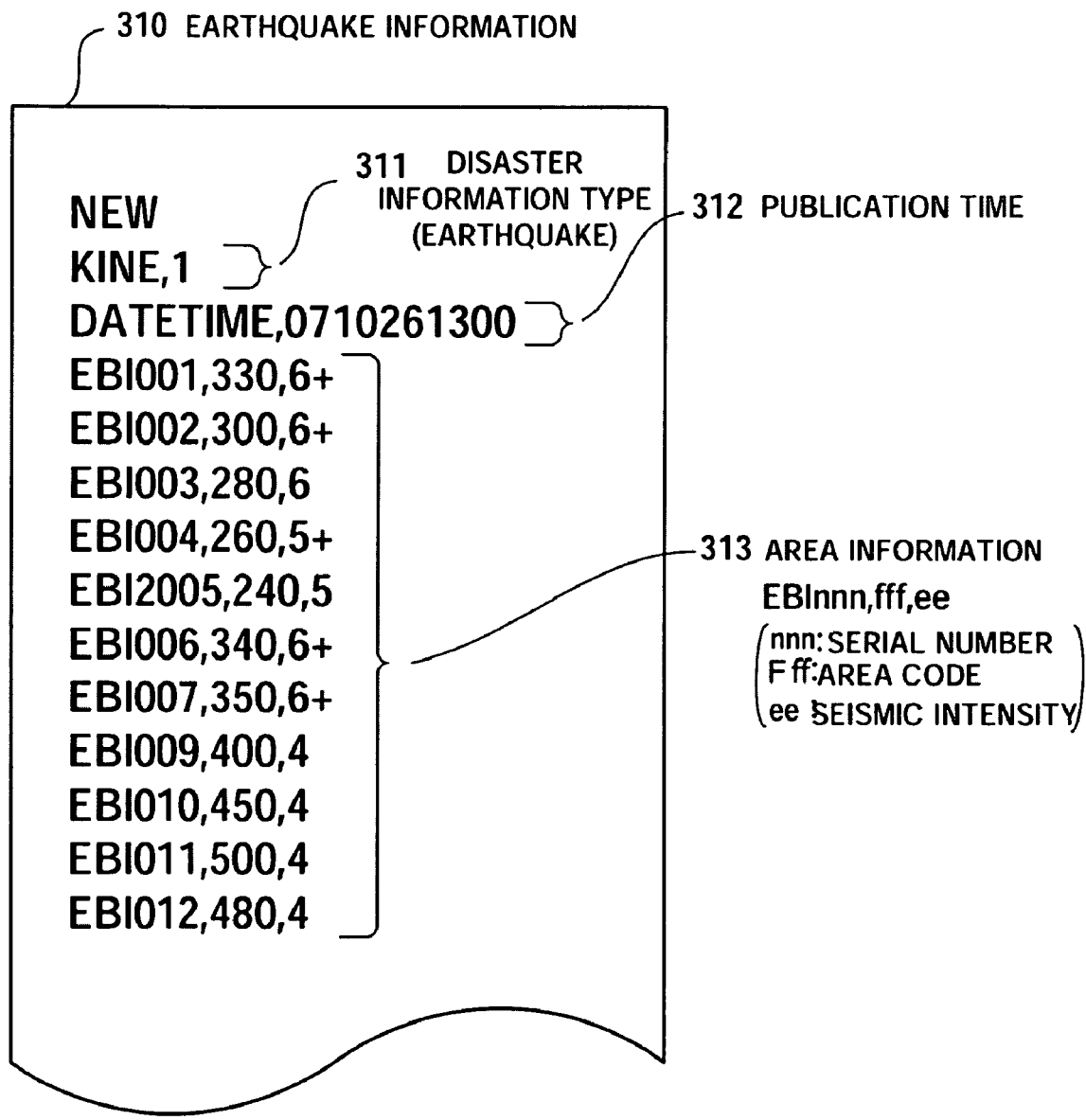
FIG. 8 is a view showing an example of earthquake information.

FIG. 8 is a view showing an example of earthquake information. Earthquake information 310 is information regarding an earthquake which has occurred, and includes a disaster information type line 311, a publication time line 312, and area information lines 313.

The disaster information type line 311 is information for specifying the type of disaster information received, and corresponds to the Contents 212 included in the received data information 210. "KINE, 1" in this example indicates that this disaster information is "earthquake information". The publication time line 312 indicates the date and hour at which the earthquake information is published. "nnn" (serial number), "fff" (area code), and "ee" (seismic intensity) are set after "EBI" in the area information lines 313.

The sign/disaster detection section 120 specifies a disaster type corresponding to "earthquake information" specified by the disaster information type line 311 included in the earthquake information 310 on the basis of the received data information 210, and obtains the disaster type "earthquake". Then the sign/disaster detection section 120 extracts all area codes "fff" described in the area information lines 313. If necessary, the value of each area code "fff" is converted in advance for associating it with the Area 222 included in the setting information 220. For example, an area code list by which the value of each area code "fff" included in the earthquake information 310 is associated with a setting information area code of four figures set in the Area 222 of the setting information 220 is registered in advance. Then the sign/disaster detection section 120 extracts a setting information area code corresponding to each area code "ff" read out from the area code list. By doing so, a conversion is made.

Figure 9:
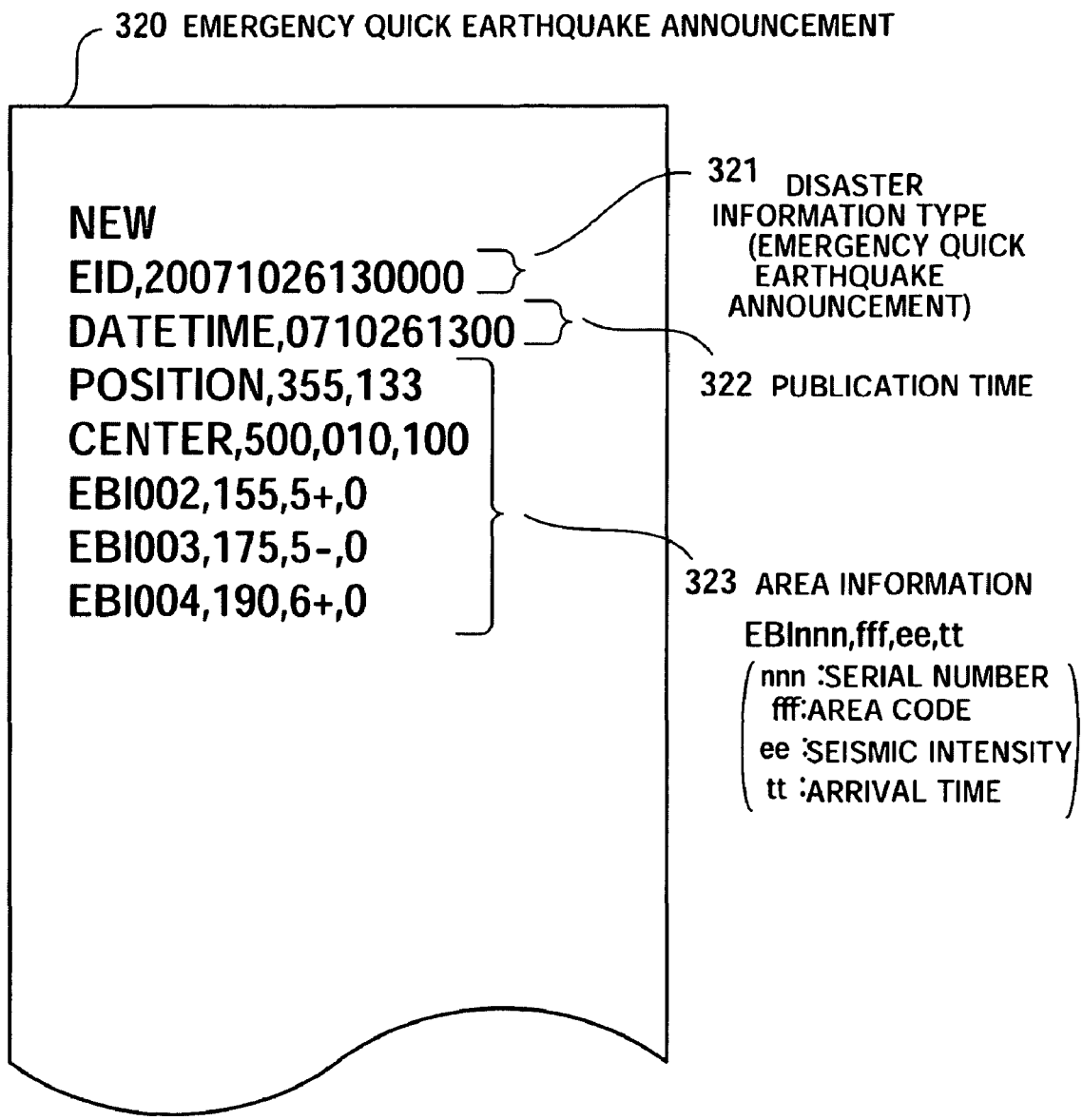
FIG. 9 is a view showing an example of an emergency quick earthquake announcement.

FIG. 9 is a view showing an example of an emergency quick earthquake announcement. Urgent quick earthquake announcement 320 is information issued at the time of a sign of an earthquake being detected, and includes a disaster information type line 321, a publication time line 322, and area information lines 323.

The disaster information type line 321 indicates the contents of disaster information. This is the same with the earthquake information 310. In "EID, 20071026130000" included in this example, not only the disaster information "emergency quick earthquake announcement" but also the date and hour are registered. The publication time line 322 indicates the date and hour at which the emergency quick earthquake announcement is published. "nnn" (serial number), "fff" (area code), "ee" (seismic intensity), and "tt" (arrival time) are set after "EBI" in the area information lines 323.

The sign/disaster detection section 120 specifies the disaster type "earthquake" on the basis of the contents of the disaster information type line 321 included in the emergency quick earthquake announcement 320. In this case, the same procedure that is adopted for the earthquake information 310 is followed. In addition, the sign/disaster detection section 120 extracts all area codes "ff" described in the area information lines 323. If necessary, conversion is made. This is the same with the earthquake information 310.

Figure 10:
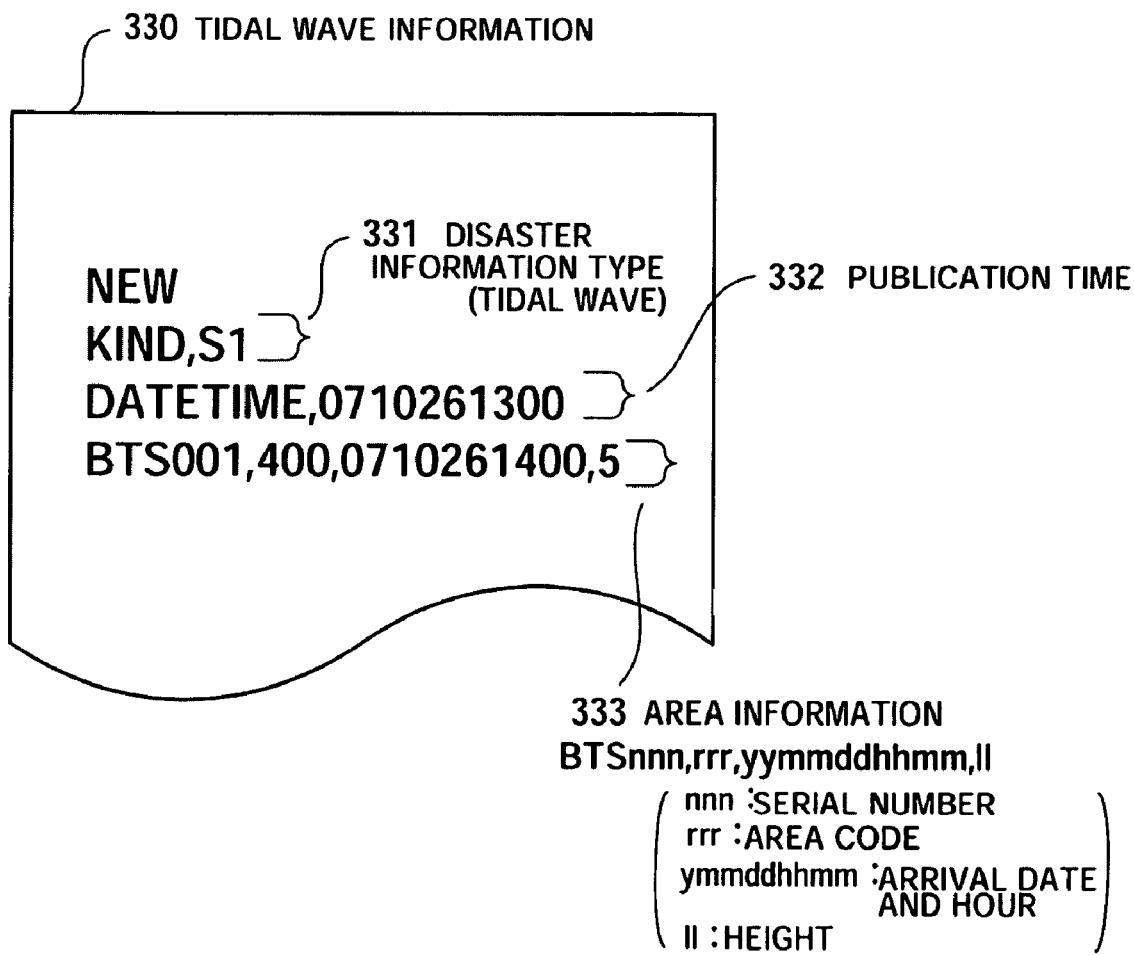
FIG. 10 is a view showing an example of tidal wave information.

FIG. 10 is a view showing an example of tidal wave information. Tidal wave information 330 is information issued at the time of the occurrence of a tidal wave being forecast, and includes a disaster information type line 331, a publication time line 332, and an area information line 333.

The disaster information type line 331 indicates the contents of disaster information. This is the same with the earthquake information 310. "KIND, S1" included in this example indicates the disaster type "tidal wave". The publication time line 332 indicates the date and hour at which the tidal wave information is published. "nnn" (serial number), "rrr" (area code), "yymmddhhmm" (arrival date and hour), and "ll" (height) are set after "BTS" in the area information line 333.

The sign/disaster detection section 120 specifies the disaster type "tidal wave" on the basis of the contents of the disaster information type line 331 included in the tidal wave information 330. In this case, the same procedure that is adopted for the earthquake information 310 is followed. In addition, the sign/disaster detection section 120 extracts all area codes "ff" described in the area information line 333. If necessary, conversion is made. This is the same with the earthquake information 310.

As stated above, the sign/disaster detection section 120 specifies the type of received disaster information, extracts portions regarding a disaster type and a disaster area from the disaster information, and specifies the disaster type and the disaster area. The cases where the earthquake information, the emergency quick earthquake announcement, and the tidal wave information are received have been described. However, if another piece of disaster information is received, the same process can be performed.

A procedure for a bandwidth control process performed by the monitoring system according to the embodiment of the present invention will now be described.

A bandwidth control process in which a bandwidth that can be used for transferring image data is assigned on the basis of image data priority corresponding to a disaster type will be described first as a first embodiment of the present invention. Then a cyclic process that is performed in the case where there is a camera for which a bandwidth cannot be ensured will be described as a second embodiment of the present invention.

Figure 11:
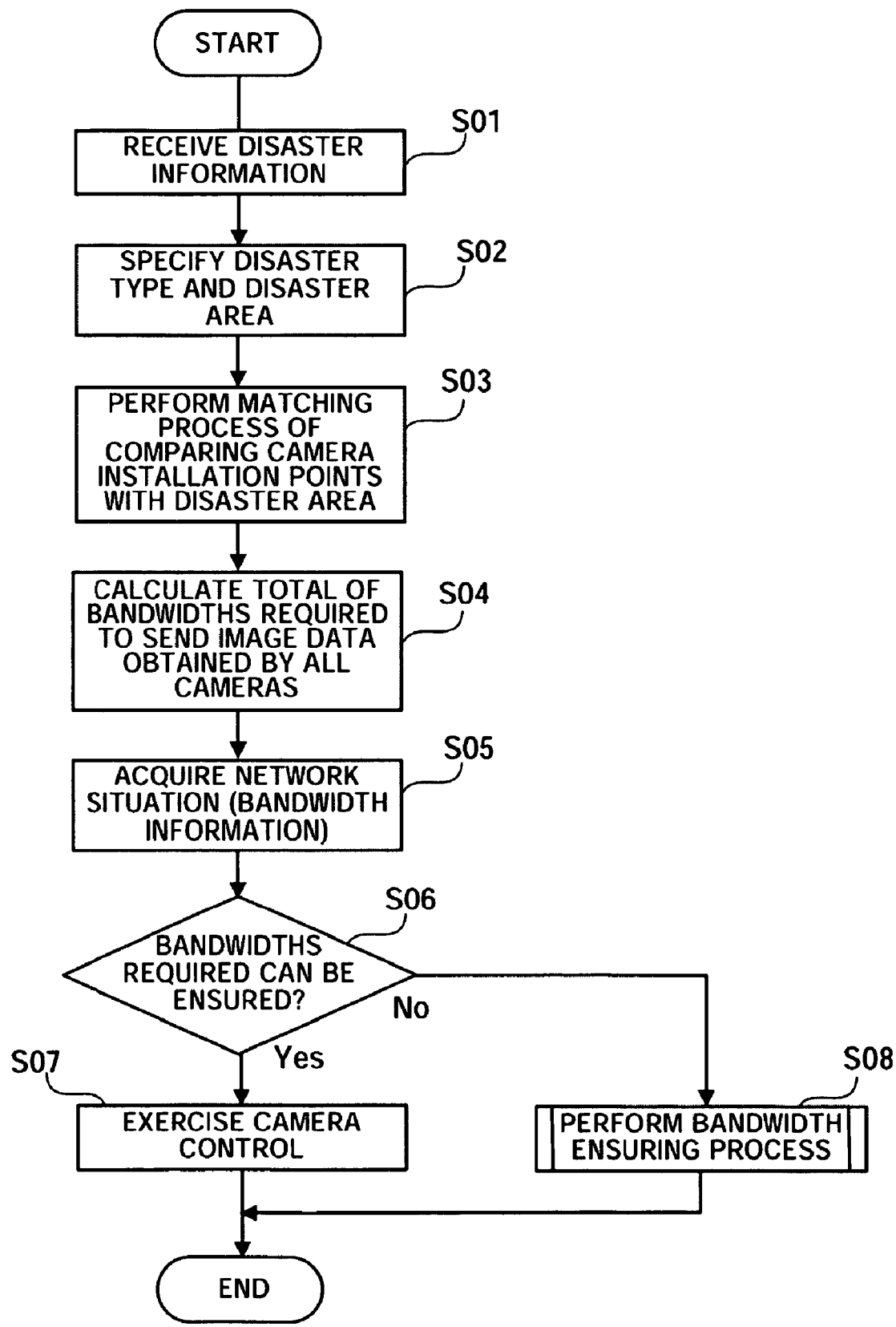
FIG. 11 is a flow chart showing a procedure for a process performed by the bandwidth control server according to the first embodiment of the present invention.

In the first embodiment of the present invention, a bandwidth required to send image data obtained by each camera is ensured in order of priority set according to a disaster type. FIG. 11 is a flow chart showing a procedure for a process performed by the bandwidth control server according to the first embodiment of the present invention.

When the bandwidth control server receives disaster information, a process starts.

[Step S01] The bandwidth control server receives disaster information sent from the disaster information offer server 61 and stores the disaster information in a predetermined temporary storage area.

[Step S02] The bandwidth control server specifies a disaster type and a disaster area on the basis of the received disaster information. In accordance with the above procedure the bandwidth control server extracts data described in corresponding lines included in the disaster information, makes conversion at need, and specifies a disaster type and a disaster area.

[Step S03] The bandwidth control server reads out the setting information 220 corresponding to the disaster type specified in step S02 from the storage section 110. Then the bandwidth control server performs the matching process of comparing camera installation points defined in the setting information 220 read out with the disaster area specified in step S02. Then the bandwidth control server extracts all pieces of setting information regarding cameras installed in the disaster area.

[Step S04] The bandwidth control server totals values defined in the Necessary Bandwidth 227 included in the setting information 220 regarding the cameras extracted in step S03 to calculate the total of bandwidths required to send image data obtained by all the cameras installed in the disaster area.

[Step S05] The bandwidth control server acquires a network situation. The network monitoring section 140 acquires, for example, monitoring results obtained by a network monitoring unit (not shown). The monitoring results of the network include bandwidth information indicative of a bandwidth of the network which can be used for transferring image data and which is measured, at the least, just before. The network monitoring section 140 may directly monitor the network.

[Step S06] The bandwidth control server compares the total (of the bandwidths required to send image data obtained by all the cameras installed in the disaster area) calculated in step S04 with the bandwidth of the network (which can be used for transferring image data) obtained in step S05 and determines whether the bandwidths required to send image data obtained by all the cameras installed in the disaster area can be ensured on the network at this point of time. If the bandwidth control server determines that the bandwidths required to send image data obtained by all the cameras installed in the disaster area can be ensured, then the bandwidth control server proceeds to step S07. If the bandwidth control server determines that the bandwidths required to send image data obtained by all the cameras installed in the disaster area cannot be ensured, then the bandwidth control server proceeds to step S08.

[Step S07] If the bandwidths required to send image data obtained by all of the cameras installed in the disaster area can be ensured, such as if a main line of the network can be used, the bandwidth control server terminates the process after exercising camera control. When the bandwidth control server exercises camera control, the bandwidth control server determines a defined direction (preset information) to be taken by each camera at the time of a disaster being detected in accordance with camera position priority on the basis of the setting information extracted in step S03, and informs each camera of the direction.

[Step S08] If the bandwidths required to send image data obtained by all the cameras installed in the disaster area cannot be ensured, such as if a failure occurred in the main line and switching to a subline has been performed, then the bandwidth control server performs the bandwidth ensuring process of ensuring the bandwidth which can be used for transferring image data on the basis of the image data priority of each camera. As a result, a bandwidth is ensured for each camera in descending order of priority. The details of the bandwidth ensuring process will be given later.

The bandwidth control server performs the above process. Accordingly, when the bandwidth control server receives the disaster information, the bandwidth control server specifies the cameras installed in the disaster area on the basis of the setting information corresponding to the disaster type notice of which is given by the disaster information. If the bandwidths required to transfer image data obtained by all the cameras specified can be ensured, then the bandwidth control server gives the cameras notice to take all directions defined in the setting information. If the bandwidths required to transfer image data obtained by all of the cameras specified cannot be ensured, then the bandwidth control server determines priority on the basis of the setting information and ensures a bandwidth for each camera in descending order of priority.

Figure 12:
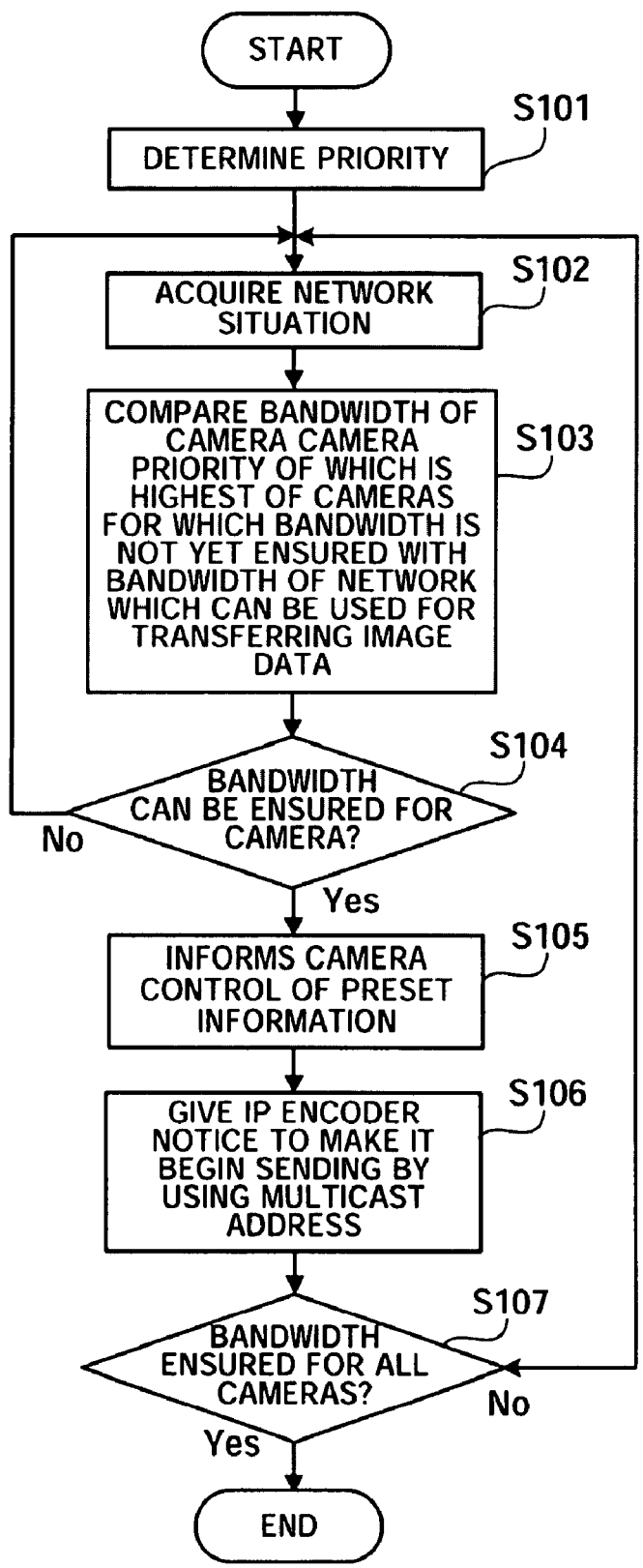
FIG. 12 is a flow chart showing a procedure for a bandwidth ensuring process according to the first embodiment of the present invention.

The bandwidth ensuring process according to the first embodiment of the present invention will now be described. FIG. 12 is a flow chart showing a procedure for the bandwidth ensuring process according to the first embodiment of the present invention. If the bandwidths required to transfer image data obtained by all the cameras installed in the disaster area cannot be ensured, the process is started.

[Step S101] The priority determination section 130 determines camera priority. The priority determination section 130 sets camera priority in order in accordance with image data priority included in the setting information extracted in step S03. That is to say, the highest camera priority is assigned to a camera the image data priority of which is the highest. The camera priority determined is stored as priority information.

[Step S102] The bandwidth control server acquires a network situation again. A network situation varies, so the bandwidth control server checks a latest network situation before ensuring a bandwidth.

[Step S103] The bandwidth control server extracts a bandwidth of a camera the camera priority of which is the highest of cameras for which a bandwidth is not yet ensured on the basis of the priority information generated in step S101 and the setting information extracted in step S03. Then the bandwidth control server compares the bandwidth with a bandwidth of the network which can be used for transferring image data and which is acquired in step S102.

[Step S104] By doing so, the bandwidth control server determines whether a bandwidth required to transfer image data obtained by the camera the camera priority of which is the highest of cameras for which a bandwidth is not yet ensured can be ensured. If a bandwidth required to transfer image data obtained by the camera the camera priority of which is the highest of cameras for which a bandwidth is not yet ensured can be ensured, then the bandwidth control server proceeds to step S105. If a bandwidth required to transfer image data obtained by the camera the camera priority of which is the highest of cameras for which a bandwidth is not yet ensured cannot be ensured, then the bandwidth control server returns to step S102 and repeats the process from acquiring a network situation.

[Step S105] If a bandwidth required to transfer image data obtained by the camera the camera priority of which is the highest of the cameras for which a bandwidth is not yet ensured can be ensured, then the bandwidth control server informs a camera control connected to the camera of preset information to designate a direction to be taken.

[Step S106] The bandwidth control server gives an IP encoder notice to make it begin sending by the use of a multicast address defined in the setting information. The bandwidth control server also gives a router notice that sending is performed by the use of the multicast address.

[Step S107] The bandwidth control server checks whether the bandwidths required to send image data obtained by all the cameras installed in the disaster area can be ensured. If the bandwidths required to send image data obtained by all the cameras installed in the disaster area cannot be ensured, then the bandwidth control server returns to step S102 and performs the process from checking a network situation. If the bandwidths required to send image data obtained by all the cameras installed in the disaster area can be ensured, then the bandwidth control server terminates the process.

If the bandwidths required to send image data obtained by all of the cameras installed in the disaster area cannot be ensured by following the above procedure, then the bandwidth control server ensures a bandwidth for each camera in order on the basis of the image data priority corresponding to the disaster type. Each camera for which a bandwidth is ensured begins the multicast sending of image data. With multicast sending, a bandwidth once ensured can be used by a corresponding camera. The bandwidth control server monitors a network situation. When the bandwidth control server can assign a bandwidth, the bandwidth control server ensures a bandwidth for each camera in order in accordance with the priority. A bandwidth which can be used for transferring image data may temporarily become narrow, depending on a network situation. In such a case, for example, a transcoder for transferring data by temporarily narrowing a bandwidth is used. After a bandwidth is once ensured, image data can be transferred.

In the above procedure, a bandwidth is not ensured (multicast address is not set) in step S07 shown in FIG. 11 if the bandwidths required to send image data obtained by all the cameras installed in the disaster area can be ensured. However, a bandwidth may be ensured (multicast address may be set). If a bandwidth is not ensured, a failure may occur in the main line in a state in which the disaster continues. When switching to the subline is performed, the process of ensuring a bandwidth for each camera in order of priority set at the time of the disaster being detected is performed.

When a bandwidth is ensured for each camera according to the disaster type by performing the above process, the details are set in the disaster state database 240.

FIG. 13 is a view showing an example of a disaster state database at the time of the occurrence of a disaster (earthquake).

The disaster state database (earthquake) 420 is generated when the bandwidth ensuring process is performed on the basis of the set values corresponding to the disaster type "earthquake" included in the setting information 220 shown in FIG. 6.

The disaster state database (earthquake) 420 includes the items of Area 421, Camera Name 422, Disaster Type 423, Selection 424, IP Address 425, Priority 426, Necessary Bandwidth 427, Camera Position Priority 428, and Camera Direction 429. The Area 421, Camera Name 422, Necessary Bandwidth 427, and Camera Position Priority 428 items of the disaster state database 420 are the same as those included in the setting information 220 and the values in the same items of the setting information 220 corresponding to the disaster type "earthquake" are also set in the Area 421, Camera Name 422, Necessary Bandwidth 427, and Camera Position Priority 428 items.

A disaster type is set in a row of the Disaster Type 423 item corresponding to a camera installed in a disaster area specified on the basis of disaster information. In this example, the disaster type "earthquake" is set in the rows corresponding to the cameras which have the names "No. 1 at Point A," "No. 2 at Point A," and "No. 3 at Point A" and which are installed in the disaster area "point A" specified on the basis of earthquake information or an emergency quick earthquake announcement received.

Whether a camera is selected as a camera installed in a disaster area is set in the Selection 424 item. If a camera is selected as a camera installed in a disaster area, then a circle (○) is registered.

An IP address currently used by a camera is set in the IP Address 425 item. An address defined in the Normal Address 224 item of the setting information 220 is registered in a normal state. When a bandwidth is ensured and instructions to perform multicast sending are given, an address defined in the Multicast Address 225 item of the setting information 220 is registered. In this example, the multicast addresses "a," "b," and "c" are registered in the rows corresponding to the cameras having the names "No. 1 at Point A," "No. 2 at Point A," and "No. 3 at Point A" respectively.

On the basis of priority corresponding to the disaster type "earthquake" included in the setting information 220, priority in a state in which an earthquake has occurred is set in the Priority 426 item. If a disaster type in the setting information 220 is "earthquake," then descending order of image data priority is "No. 1 at Point A," "No. 1 at Point B," "No. 1 at Point C," "No. 3 at Point A," "No. 2 at Point A," and "No. 2 at Point B". When the priority determination section 130 determines priority, the priority determination section 130 gives the highest priority to the cameras installed in the disaster area "point A" in which an earthquake has occurred. In this case, the descending order of priority of "No. 1 at Point A," "No. 3 at Point A," and "No. 2 at Point A" is set on the basis of priority at the point A. Image data priority at the other points is set next the cameras installed at the point A on the basis of priority at normal time. Priority set in this way is set in the Priority 426 item as priority information.

A direction to be taken by each camera corresponding to a disaster type is set in the Camera Position Priority 428 item on the basis of the setting information 220. For example, the camera direction "preset information 1" is set for the camera having the name "No. 1 at Point A".

As stated above, when an earthquake has occurred, image data priority and a camera direction are set on the basis of the disaster type "earthquake" of the setting information 220 and the contents of the image data priority and the camera direction are registered in the disaster state database 420.

The case where tidal wave information is acquired as disaster information will now be described. FIG. 14 is a view showing an example of a disaster state database at the time of the occurrence of a disaster (tidal wave).

A disaster state database 430 is generated when the bandwidth ensuring process is performed on the basis of the set values corresponding to the disaster type "tidal wave" included in the setting information 220 shown in FIG. 6.

The same values that are included in the disaster state database (earthquake) 420 shown in FIG. 13 are set in Area 421, Camera Name 422, and Necessary Bandwidth 427 items shown in FIG. 14 on the basis of the setting information 220.

A value corresponding to a disaster type is set in a row of a Disaster Type 433 item corresponding to a camera installed in a disaster area specified on the basis of the disaster information. In this example, the disaster type "tidal wave" is set in the rows corresponding to the cameras which have the names "No. 1 at Point A," "No. 2 at Point A," and "No. 3 at Point A" and which are installed in the disaster area "point A" specified on the basis of the tidal wave information received.

Whether a camera is selected as a camera installed in a disaster area is set in a Selection 434 item. The contents of the Selection 434 item are the same as those of the Selection 424 item included in the disaster state database (earthquake) 420.

An IP address currently used by a camera is set in an IP Address 435 item. The contents of the IP Address 435 item are the same as those of the IP Address 425 item included in the disaster state database (earthquake) 420.

On the basis of priority corresponding to the disaster type "tidal wave" included in the setting information 220, priority in a state in which a tidal wave has occurred is set in a Priority 436 item. If a disaster type in the setting information 220 is "tidal wave," then descending order of image data priority is "No. 2 at Point A," "No. 1 at Point B," "No. 1 at Point C," "No. 3 at Point A," "No. 2 at Point B," and "No. 1 at Point A". When the priority determination section 130 determines priority, the priority determination section 130 gives the highest priority to the cameras installed in the disaster area "point A" in which a tidal wave has occurred. In this case, the descending order of priority of "No. 2 at Point A," "No. 3 at Point A," and "No. 1 at Point A" is set on the basis of priority at the point A. Image data priority at the other points is set next the cameras installed at the point A on the basis of priority at normal time. Priority set in this way is set in the Priority 436 item.

A direction to be taken by each camera corresponding to a disaster type is set in a Camera Position Priority 438 item on the basis of the setting information 220. For example, the camera direction "preset information 2" is set for the camera having the name "No. 1 at Point A".

As stated above, when a tidal wave has occurred, image data priority and a camera direction are set on the basis of the disaster type "tidal wave" of the setting information 220 and the contents of the image data priority and the camera direction are registered in the disaster state database 430. As is obvious by comparison with FIG. 13, priority for sending image data obtained by cameras and camera directions depend on a disaster type. The most important image data can preferentially be obtained under different situations.

As has been described, the bandwidth control server 10 determines a disaster type on the basis of disaster information received and sets priority for sending image data obtained by cameras installed in a disaster area on the basis of image data priority defined according to the disaster type.

Information exchanged between each processing section of the bandwidth control server 10 and each camera installed at the point A in the case of a disaster area being the point A will now be described.

Figure 15:
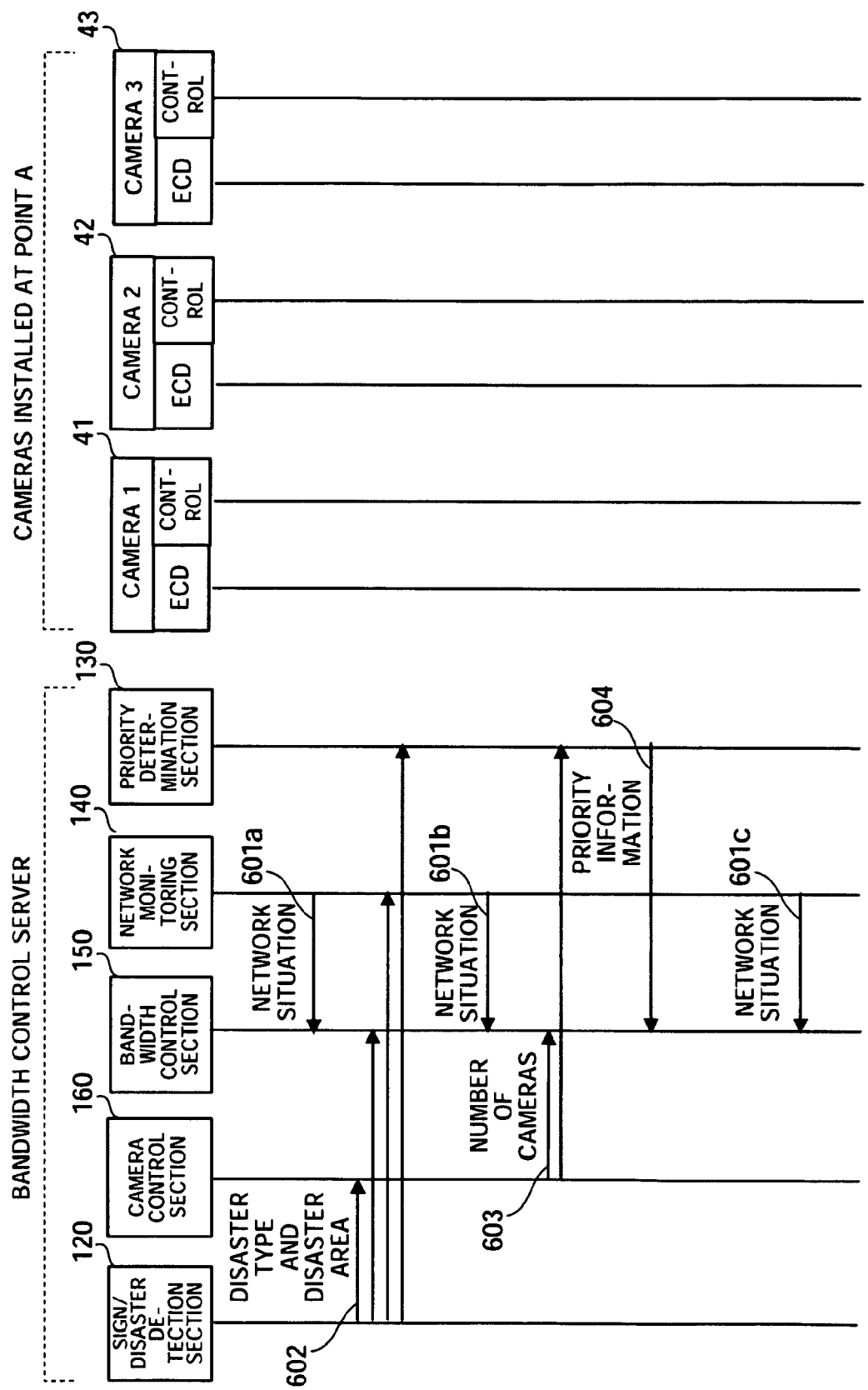
FIG. 15 is a sequence diagram showing a procedure of a bandwidth control process from the detection of a disaster to the determination of priority.

FIG. 15 is a sequence diagram showing a procedure of a bandwidth control process from the detection of a disaster to the determination of priority. Components that are the same as those shown in FIG. 4 are given the same numbers. In FIG. 15, all of a camera 1 (41*a*), an IP encoder 41*b*, and a camera control 41*c* are indicated by a camera 1 (41). An IP encoder is abbreviated to "ECD" and a camera control is abbreviated to "control". The following descriptions will be given in accordance with FIG. 15.

A network monitoring section 140 monitors the state of a network even at normal time and informs a bandwidth control section 150 of a network situation at regular intervals or at predetermined timing (601*a*, 601*b*, and 601*c*).

When a sign/disaster detection section 120 receives disaster information and specifies a disaster type and a disaster area on the basis of the disaster information, the sign/disaster detection section 120 informs a camera control section 160, the bandwidth control section 150, the network monitoring section 140, and a priority determination section 130 of the disaster type and the disaster area (602). The camera control section 160 calculates the number of cameras and informs the priority determination section 130 and the bandwidth control section 150 of the number of the cameras (603). The priority determination section 130 which acquires the number of the cameras determines priority for sending image data obtained by target cameras on the basis of the setting information 220 and generates priority information. The priority information is sent to the bandwidth control section 150 (604). In the following descriptions it is assumed that the descending order of priority of the camera 1 (41), a camera 2 (42), and a camera 3 (43) is set.

The bandwidth control section 150 begins a bandwidth ensuring process on the basis of the priority information and a latest network situation (601*c*).

Figure 16:
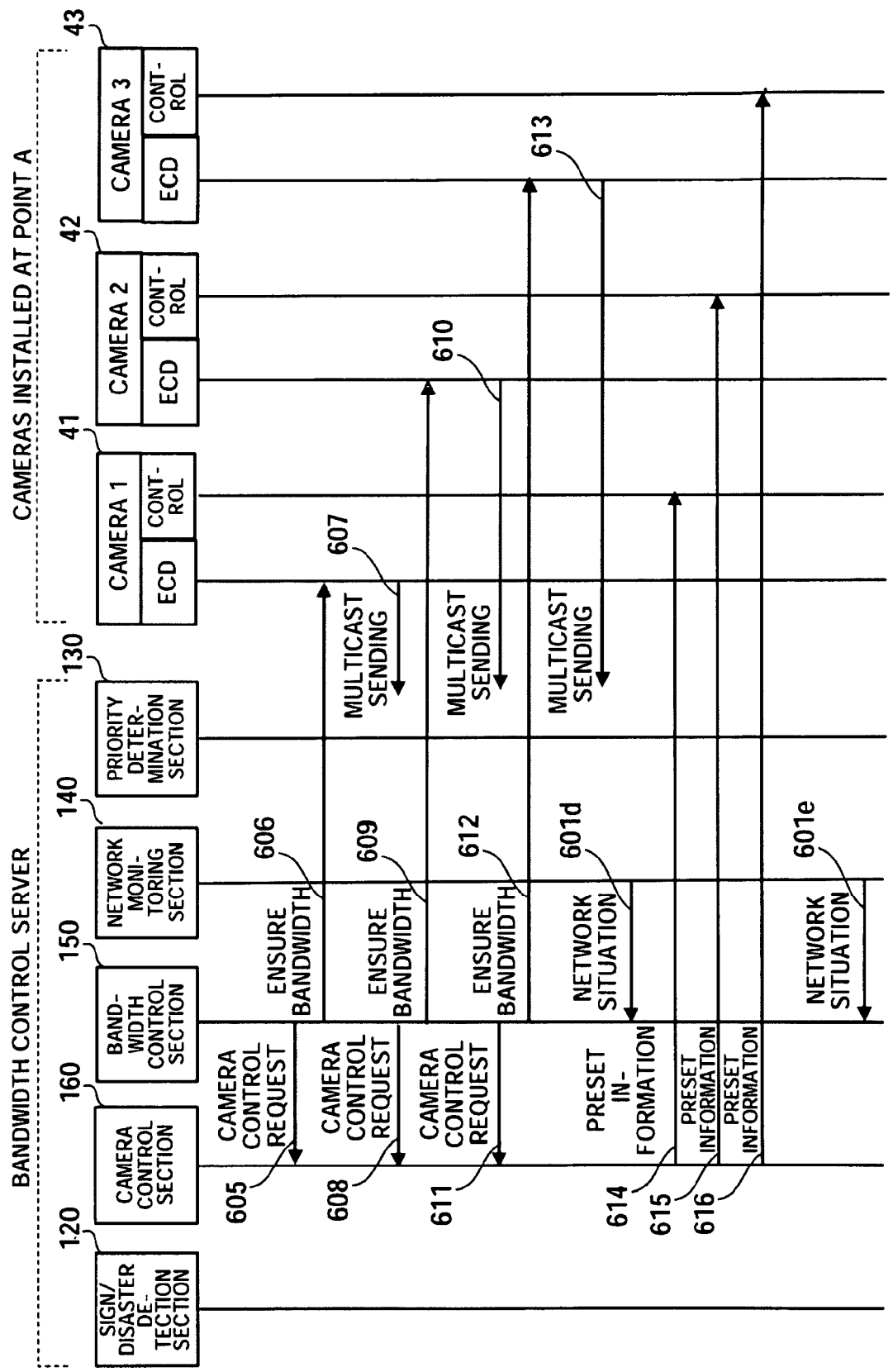
FIG. 16 is a sequence diagram showing a procedure of the bandwidth control process from the beginning of a bandwidth ensuring process to the sending of notice to a camera.

FIG. 16 is a sequence diagram showing a procedure of the bandwidth control process from the beginning of a bandwidth ensuring process to the sending of notice to a camera. A procedure shown in FIG. 16 is performed after the procedure shown in FIG. 15.

The network monitoring section 140 monitors the state of the network and informs the bandwidth control section 150 of a network situation at regular intervals or at predetermined timing (601*d* and 601*e*). This is the same with FIG. 15.

First the bandwidth control section 150 ensures a bandwidth for the camera 1 (41) on the basis of the priority set in the priority information. When the bandwidth control section 150 ensures the bandwidth, the bandwidth control section 150 sends the camera control section 160 a camera control request on the camera 1 (41) (605). Then the bandwidth control section 150 informs an ECD of the camera 1 (41) about a multicast address (606). By doing so, the camera 1 (41) begins multicast sending by the use of the multicast address about which the ECD of the camera 1 (41) is informed (607). If the bandwidth control section 150 can ensure a bandwidth for the camera 2 (42), then the bandwidth control section 150 sends the camera control section 160 a camera control request on the camera 2 (42) (608) and informs an ECD of the camera 2 (42) about a multicast address (609). By doing so, the camera 2 (42) begins multicast sending by the use of the multicast address about which the ECD of the camera 2 (42) is informed (610). Furthermore, if the bandwidth control section 150 can ensure a bandwidth for the camera 3 (43), then the bandwidth control section 150 sends the camera control section 160 a camera control request on the camera 3 (43) (611) and informs an ECD of the camera 3 (43) about a multicast address (612). By doing so, the camera 3 (43) begins multicast sending by the use of the multicast address about which the ECD of the camera 3 (43) is informed (613).

The camera control section 160 acquires preset information regarding the cameras the camera control requests (605, 608, and 611) on which the camera control section 160 receives, and sends the preset information to the camera 1 (41), the camera 2 (42), and the camera 3 (43) (614, 615, and 616). The camera controls of the cameras which acquire the preset information turn the corresponding cameras to directions designated in the preset information.

As has been described, when the bandwidth control server 10 receives disaster information, the bandwidth control server 10 determines priority for sending image data obtained by cameras in accordance with priority corresponding to a disaster type set in advance. Then the bandwidth control server 10 ensures in order a bandwidth for sending image data in accordance with the determined priority and makes each camera begin multicast sending. As a result, a monitoring system can display image data for a disaster area on a monitor in accordance with the priority corresponding to the disaster type.

In the above descriptions a piece of disaster information of one type is received. Actually, however, plural pieces of disaster information may be issued at the same time. In such a case, the following method, for example, is adopted. The bandwidth control server 10 determines priority for sending image data obtained by cameras with priority defined in advance according to disaster type taken into consideration. A rule for determining priority according to a combination of the disaster types of disasters which have occurred may be defined in advance.

In the above procedure a bandwidth is ensured in order for each came if the bandwidth of a network 20 which can be used is sufficient to transfer image data. Even if a bandwidth cannot be ensured for a camera, a bandwidth is ensured for the camera when the bandwidth of the network 20 has become enough after a while. However, time taken to ensure a bandwidth for all cameras is indefinite. Accordingly, there are cases where image data obtained by lower priority cameras cannot be acquired for a long period of time.

A cyclic process for sharing a bandwidth ensured by a plurality of cameras and cyclically sending image data will now be described as a second embodiment of the present invention.

The flow of the entire process according to a second embodiment of the present invention is the same as the procedure shown in FIG. 11. However, a procedure of a bandwidth ensuring process performed in the cyclic process differs from that shown in FIG. 12. A bandwidth ensuring process performed in the cyclic process will now be described.

Figure 17:
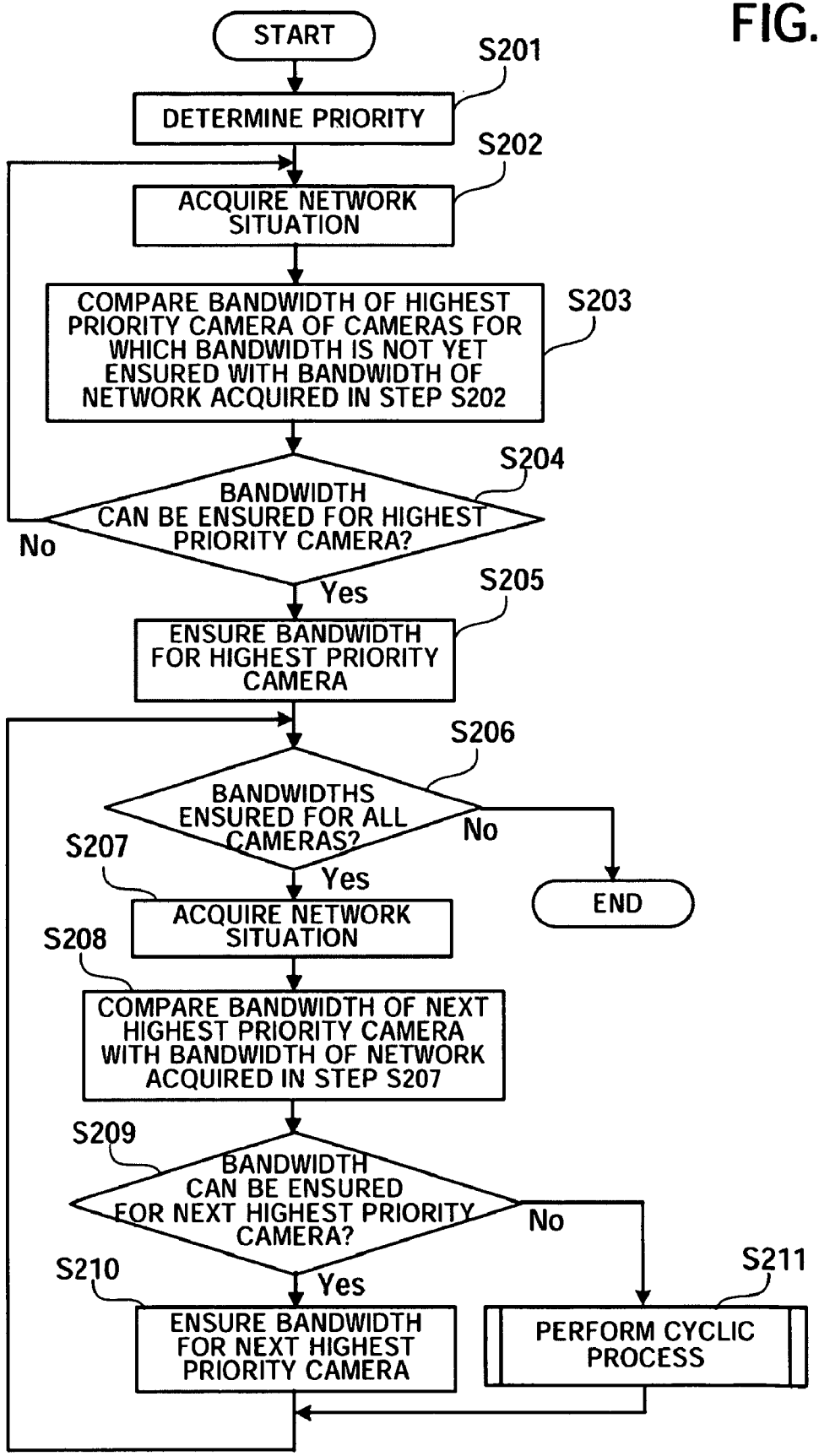
FIG. 17 is a flow chart showing a procedure of a bandwidth ensuring process according to a second embodiment of the present invention.

FIG. 17 is a flow chart showing a procedure of a bandwidth ensuring process according to the second embodiment of the present invention. A condition under which a bandwidth ensuring process is begun is the same as that under which the procedure shown in FIG. 12 is begun.

[Step S201] The priority determination section 130 determines camera priority. A priority determination method is the same as that used in step S101 shown in FIG. 12.

[Step S202] The bandwidth control server acquires a network situation again. A network situation varies, so the bandwidth control server checks a latest network situation before ensuring a bandwidth.

[Step S203] The bandwidth control server extracts a bandwidth of a highest priority camera of cameras for which a bandwidth is not yet ensured on the basis of the priority information generated in step S201 and the setting information extracted in step S03. Then the bandwidth control server compares the bandwidth with a bandwidth of the network which can be used for transferring image data and which is acquired in step S202.

[Step S204] By doing so, the bandwidth control server determines whether a bandwidth required to transfer image data obtained by the highest priority camera of the cameras for which a bandwidth is not yet ensured can be ensured. If a bandwidth required to transfer image data obtained by the highest priority camera of the cameras for which a bandwidth is not yet ensured can be ensured, then the bandwidth control server proceeds to step S205. If a bandwidth required to transfer image data obtained by the highest priority camera of the cameras for which a bandwidth is not yet ensured cannot be ensured, then the bandwidth control server returns to step S202 and repeats the process from acquiring a network situation.

[Step S205] If a bandwidth required to transfer image data obtained by the highest priority camera of the cameras for which a bandwidth is not yet ensured can be ensured, then the bandwidth control server informs a camera control connected to the camera of preset information to designate a direction to be taken. In addition, the bandwidth control server gives an IP encoder notice to make it begin sending by the use of a multicast address defined in the setting information. Furthermore, the bandwidth control server gives a router notice that sending is performed by the use of the multicast address.

[Step S206] The bandwidth control server checks whether the bandwidths required to send image data obtained by all the cameras installed in the disaster area can be ensured. If the bandwidths required to send image data obtained by all the cameras installed in the disaster area cannot be ensured, then the bandwidth control server proceeds to step S207. If the bandwidths required to send image data obtained by all the cameras installed in the disaster area can be ensured, then the bandwidth control server terminates the process.

[Step S207] The bandwidth control server acquires a network situation again.

[Step S208] The bandwidth control server compares a bandwidth of a next highest priority camera to the camera for which the bandwidth is ensured with a bandwidth of the network which can be used for transferring image data and which is acquired in step S207.

[Step S209] By doing so, the bandwidth control server determines whether a bandwidth required to send image data obtained by the next highest priority camera can be ensured. If a bandwidth required to send image data obtained by the next highest priority camera can be ensured, then the bandwidth control server proceeds to step S210. If a bandwidth required to send image data obtained by the next highest priority camera cannot be ensured, then the bandwidth control server proceeds to step S211.

[Step S210] If a bandwidth required to send image data obtained by the next highest priority camera can be ensured, then the bandwidth control server informs a camera control connected to the next highest priority camera of preset information to designate a direction to be taken. In addition, the bandwidth control server gives an IP encoder notice to make it begin sending by the use of a multicast address defined in the setting information. Furthermore, the bandwidth control server gives a router notice that sending is performed by the use of the multicast address, and returns to step S206.

[Step S211] If a bandwidth required to send image data obtained by the next highest priority camera cannot be ensured, then the bandwidth control server performs a cyclic process. In the cyclic process, a bandwidth ensured last (bandwidth ensured for sending image data obtained by a lowest priority camera of bandwidths ensured) is shared by the camera to which the bandwidth is assigned and cameras the priority of which is lower than that of the camera. To be concrete, when a certain period of time elapses after the beginning of sending image data obtained by the camera to which the bandwidth is assigned first, the sending of image data obtained by this camera is stopped and the bandwidth is freed. Then the free bandwidth is assigned to a next highest priority camera to this camera. After that, the bandwidth control server returns to step S206.

The cyclic process will now be described by giving a concrete example. For the sake of simplicity it is assumed that a bandwidth is assigned to three cameras which rank first, second, and third in priority. Even if a larger number of cameras are installed, the same process is performed.

Figure 18:
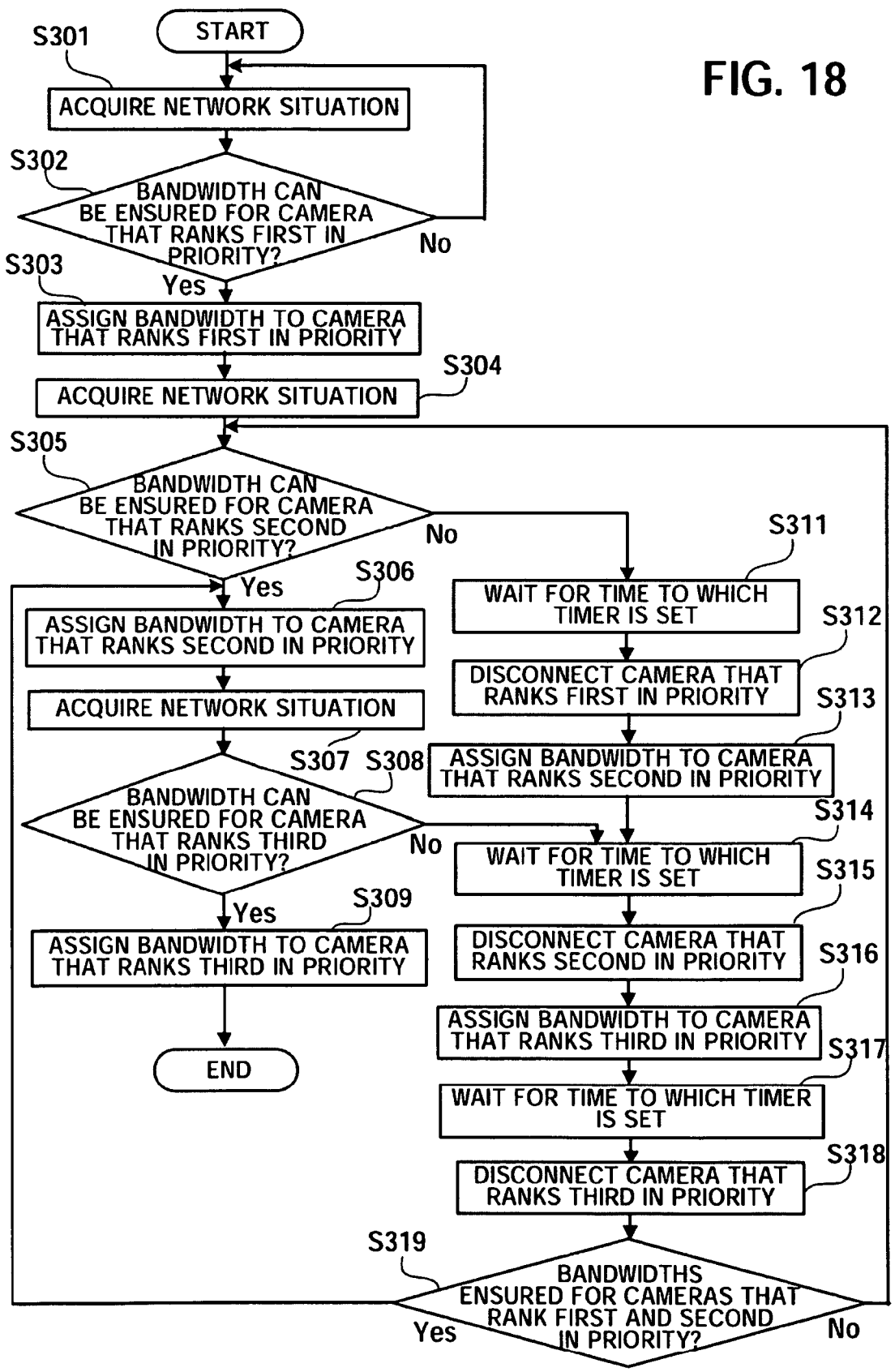
FIG. 18 is a flow chart showing a procedure of a cyclic process.

FIG. 18 is a flow chart showing a procedure of a cyclic process. In FIG. 18, a procedure performed after determination of priority (step S201) shown in FIG. 17 terminates is shown. A bandwidth is assigned to three cameras which rank first, second, and third in priority.

[Step S301] The bandwidth control server acquires a network situation.

[Step S302] The bandwidth control server compares a bandwidth which is required to send image data obtained by the camera that ranks first in priority and which is defined in the setting information with a usable bandwidth of the network based on the network situation acquired in step S301 in order to determine whether a bandwidth can be ensured for the camera that ranks first in priority. If a bandwidth can be ensured for the camera that ranks first in priority, then the bandwidth control server proceeds to step S303. If a bandwidth cannot be ensured for the camera that ranks first in priority, then the bandwidth control server returns to step S301.

[Step S303] The bandwidth control server assigns the bandwidth ensured to the camera that ranks first in priority.

By performing the above procedure, the bandwidth is ensured for the camera that ranks first in priority, and image data obtained by the camera that ranks first in priority can be sent.

[Step S304] The bandwidth control server acquires a network situation.

[Step S305] The bandwidth control server compares a bandwidth which is required to send image data obtained by the camera that ranks second in priority and which is defined in the setting information with a usable bandwidth of the network based on the network situation acquired in step S304 in order to determine whether a bandwidth can be ensured for the camera that ranks second in priority. If a bandwidth can be ensured for the camera that ranks second in priority, then the bandwidth control server proceeds to step S306. If a bandwidth cannot be ensured for the camera that ranks second in priority, then the bandwidth control server proceeds to step S311.

[Step S306] The bandwidth control server assigns the bandwidth ensured to the camera that ranks second in priority.

By performing the above procedure, the bandwidths are ensured for the cameras that rank first and second in priority, and image data obtained by the cameras that rank first and second in priority can be sent.

[Step S307] The bandwidth control server acquires a network situation.

[Step S308] The bandwidth control server compares a bandwidth which is required to send image data obtained by the camera that ranks third in priority and which is defined in the setting information with a usable bandwidth of the network based on the network situation acquired in step S307 in order to determine whether a bandwidth can be ensured for the camera that ranks third in priority. If a bandwidth can be ensured for the camera that ranks third in priority, then the bandwidth control server proceeds to step S309. If a bandwidth cannot be ensured for the camera that ranks third in priority, then the bandwidth control server proceeds to step S314.

[Step S309] The bandwidth control server assigns the bandwidth ensured to the camera that ranks third in priority, and terminates the process.

By performing the above procedure, the bandwidths are ensured for the cameras that rank first, second, and third in priority, and image data obtained by the cameras that rank first, second, and third in priority can be sent.

A cyclic process will now be described. If the bandwidth is ensured only for the camera that ranks first in priority by performing steps S301 through S305, this bandwidth is shared and is cyclically used by the cameras that rank first, second, and third in priority. If the bandwidths are ensured for the cameras that rank first and second in priority by performing steps S301 through S306, the bandwidth assigned to the camera that ranks second in priority and that is a lower priority camera is shared and is cyclically used by the cameras that rank second and third in priority.

[Step S311] If the bandwidth is ensured for the camera that ranks first in priority and bandwidths are not ensured for the cameras that rank second and third in priority, then a timer is set to predetermined wait time and image data obtained by the camera that ranks first in priority is sent for this wait time.

[Step S312] The camera that ranks first in priority is disconnected after the elapse of the wait time set in step S311.

[Step S313] The bandwidth which becomes free by disconnecting the camera that ranks first in priority is assigned to the camera that ranks second in priority. As a result, image data obtained by the camera that ranks second in priority can be sent.

[Step S314] The timer is set to predetermined wait time for which image data obtained by the camera that ranks second in priority is sent, and timing is performed. Image data obtained by the camera that ranks second in priority is sent for this wait time.

[Step S315] The camera that ranks second in priority is disconnected after the elapse of the wait time set in step S314.

[Step S316] The bandwidth which becomes free by disconnecting the camera that ranks second in priority is assigned to the camera that ranks third in priority. As a result, image data obtained by the camera that ranks third in priority can be sent.

[Step S317] The timer is set to predetermined wait time for which image data obtained by the camera that ranks third in priority is sent, and timing is performed. Image data obtained by the camera that ranks third in priority is sent for this wait time.

[Step S318] The camera that ranks third in priority is disconnected after the elapse of the wait time set in step S317.

[Step S319] The bandwidth control server determines whether bandwidths are ensured for the cameras that rank first and second in priority. If bandwidths are not ensured for the cameras that rank first and second in priority, then the bandwidth control server determines that a bandwidth is shared by the three cameras that rank first, second, and third in priority, and proceeds to step S303. If bandwidths are ensured for the cameras that rank first and second in priority, then the bandwidth control server determines that a bandwidth is shared by the two cameras that rank second and third in priority, and proceeds to step S306.

If a bandwidth cannot be ensured for a lower priority camera, the above procedure should be performed. By doing so, a bandwidth ensured for a lowest priority camera of cameras for which bandwidths are ensured can be used as a shared bandwidth for sending image data obtained by all the cameras. When the cycle of the cyclic process ends, a network situation is acquired again and whether a bandwidth can be ensured for a camera for which a bandwidth is not yet ensured is determined. Therefore, if a network situation improves, a bandwidth can be ensured for each camera in descending order of priority.

Information set is stored in the disaster state database 240. Information set by the use of a camera selection screen displayed on the basis of the disaster state database 240 will now be described.

FIG. 19 is a view showing an example of a camera selection screen displayed at the time of a cyclic process being performed. A camera selection screen 500 informs a user of the state of the cameras at the present and is displayed on the monitoring unit on the basis of the disaster state database 240.

The items of Selection 501, Camera Name 502, Disaster State 503, Disaster Type 504, Camera Direction 505, and Remark 506 are displayed on the camera selection screen 500.

Whether each camera is selected as a camera installed in a disaster area is displayed in the Selection 501 item. A name given to each camera is displayed in the Camera Name 502 item. A disaster state, that is to say, a disaster (state in which the disaster has occurred), a sign (state in which a sign of a disaster has been detected), or a normal state is displayed in the Disaster State 503 item. If a disaster state is a "disaster" or a "sign," the type of the disaster is displayed in the Disaster Type 504 item. A direction to be taken by each camera is displayed in the Camera Direction 505 item. Reference information is displayed in the Remark 506 item.

In the example shown in FIG. 19, a state in which bandwidths can be ensured for the cameras "No. 1" and "No. 2" installed at the point A where a disaster is detected and in which a bandwidth cannot be ensured for the camera "No. 3" installed at the point A is displayed. In this case, a cyclic process is performed by the use of the bandwidth ensured for the camera "No. 2". The bandwidth ensured for the camera "No. 2" is shared by the cameras "No. 2" and "No. 3" and the cyclic process is performed. This is indicated in the Remark 506 item.

Information exchanged between each section of the bandwidth control server 10 and the cameras installed at the point A in the case of performing a cyclic process will now be described. A procedure to the setting of priority is the same as that shown in FIG. 15, so descriptions of it will be omitted. Descriptions of the case (where a cyclic process is performed between the cameras "No. 2" and "No. 3") shown in FIG. 19 will now be given.

Figure 20:
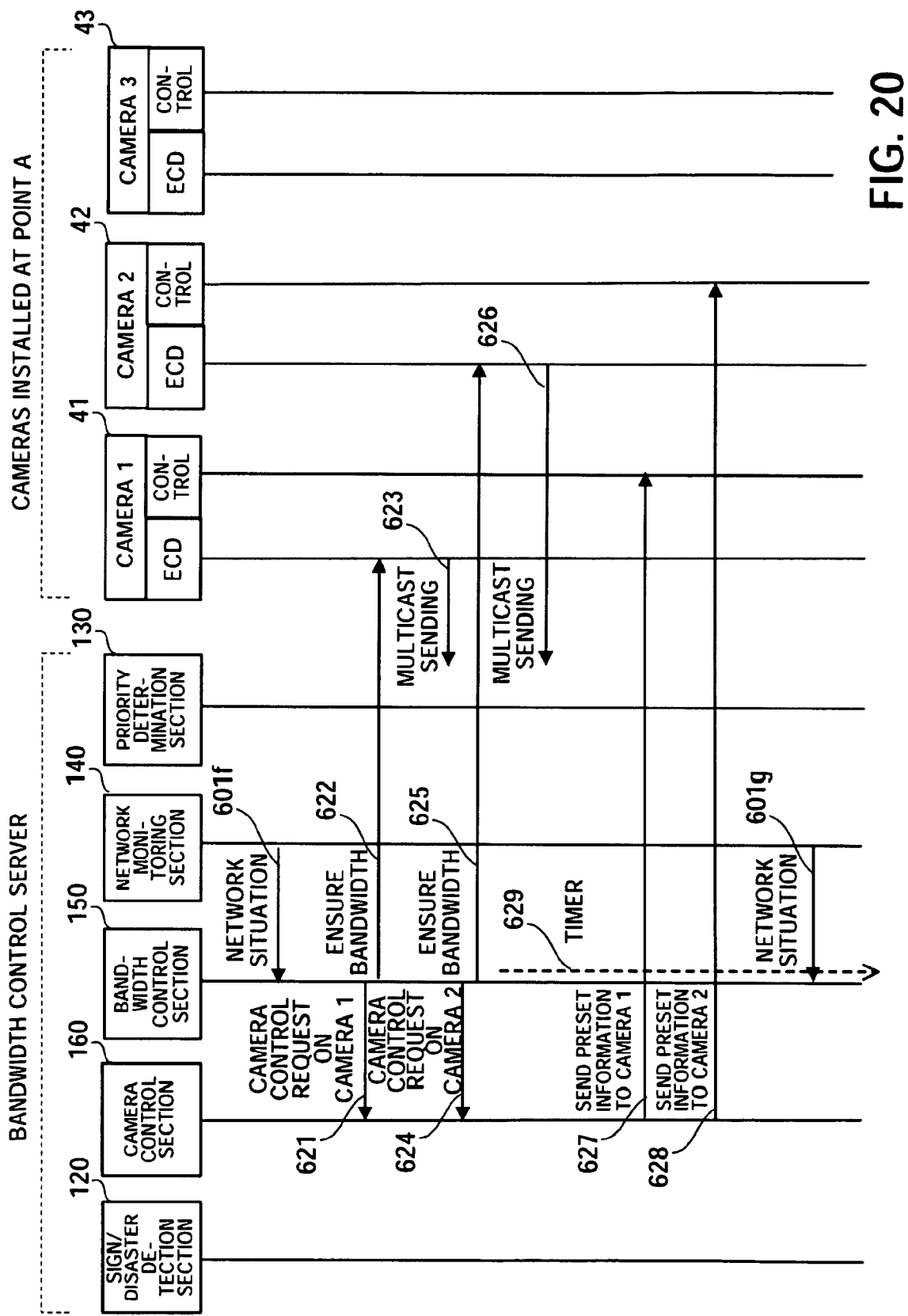
FIG. 20 is a sequence diagram showing a procedure from the beginning of a bandwidth control process to the beginning of a cyclic process.

FIG. 20 is a sequence diagram showing a procedure from the beginning of a bandwidth control process to the beginning of a cyclic process.

The network monitoring section 140 monitors the state of the network and informs the bandwidth control section 150 of a network situation at regular intervals or at predetermined timing (601f and 601g).

First the bandwidth control section 150 ensures a bandwidth for the camera 1 (41) on the basis of priority set in priority information. When the bandwidth control section 150 ensures the bandwidth, the bandwidth control section 150 sends the camera control section 160 a camera control request on the camera 1 (41) (621). Then the bandwidth control section 150 informs the ECD of the camera 1 (41) about a multicast address in order to inform that the bandwidth is ensured (622). By doing so, the camera 1 (41) begins multicast sending by the use of the multicast address about which the ECD of the camera 1 (41) is informed (623). If the bandwidth control section 150 can ensure a bandwidth for the camera 2 (42), then the bandwidth control section 150 sends the camera control section 160 a camera control request on the camera 2 (42) (624) and informs the ECD of the camera 2 (42) about a multicast address (625). By doing so, the camera 2 (42) begins multicast sending by the use of the multicast address about which the ECD of the camera 2 (42) is informed (626).

Then the bandwidth control section 150 determines whether a bandwidth can be ensured for the camera 3 (43). It is assumed that a bandwidth cannot be ensured for the camera 3 (43). In this case, the timer is set to predetermined time (629) and the bandwidth control section 150 waits until the time set elapses. During this time, the camera control section 160 sends preset information to the camera 1 (41) (627) and sends preset information to the camera 2 (42) (628). The camera controls of the cameras which acquire the preset information turn the corresponding cameras to directions designated in the preset information.

A process performed after the elapse of the time to which the timer is set will now be described.

Figure 21:
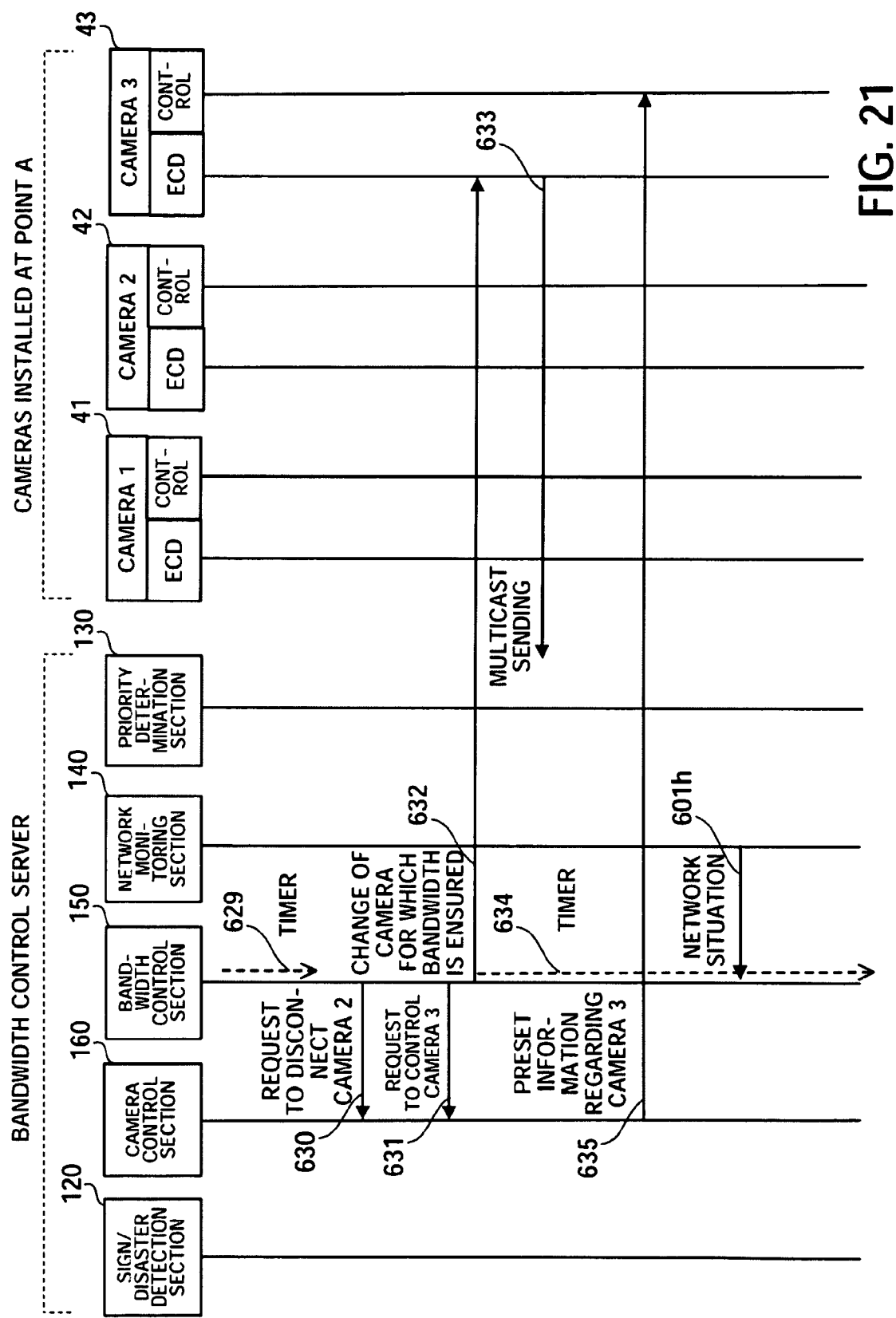
FIG. 21 is a sequence diagram showing a procedure of the cyclic process.

FIG. 21 is a sequence diagram showing a procedure of the cyclic process.

When the time to which the timer is set in the timer setting step (629) in the case where a bandwidth cannot be ensured for the camera 3 (43) elapses, the bandwidth control section 150 requests the camera control section 160 to disconnect the camera 2 (630). The camera control section 160 disconnects the camera 2 (42). Then the bandwidth control section 150 requests the camera control section 160 to control the camera 3 (43) (631). The bandwidth control section 150 gives the camera 3 (43) notice to make it use the bandwidth ensured for the camera 2 (42) (632). To be concrete, the bandwidth control section 150 informs the ECD of the camera 3 (43) about a multicast address corresponding to the camera 3 (43). By doing so, the camera 3 (43) begins multicast sending by the use of the multicast address about which the ECD of the camera 3 (43) is informed (633). Furthermore, the bandwidth control section 150 sets the timer to time for which the camera 3 (43) uses the bandwidth (634). The camera control section 160 sends the camera 3 (43) preset information regarding the camera 3 (43) (635). The above procedure is performed and a bandwidth use camera is switched from the camera 2 (42) to the camera 3 (43).

When the time to which the timer is set in the timer setting step (634) elapses, a bandwidth use camera is switched from the camera 3 (43) to the camera 2 (42).

As has been described, when the bandwidth control server 10 receives disaster information, the bandwidth control server 10 determines priority for sending image data obtained by cameras in accordance with priority corresponding to a disaster type set in advance. Then the bandwidth control server 10 ensures in order a bandwidth required to send image data in accordance with the determined priority. If there is a camera for which a bandwidth cannot be ensured, a cyclic process by which a bandwidth ensured is shared on a time division basis is performed. As a result, a monitoring system can also display image data obtained by a low priority camera on a monitor, though the frequency of update decreases.

The above functions can be realized with a computer. In this case, a program in which the contents of the functions the bandwidth control server should have are described is provided. By executing this program on the computer, the above functions are realized on the computer. This program can be recorded on a computer readable record medium. A computer readable record medium can be a magnetic recording device, an optical disk, a magneto-optical recording medium, a semiconductor memory, or the like. A magnetic recording device can be a hard disk drive (HDD), a flexible disk (FD), a magnetic tape, or the like. An optical disk can be a digital versatile disk (DVD), a digital versatile disk random access memory (DVD-RAM), a compact disk read only memory (CD-ROM), a compact disk recordable (CD-R)/rewritable (CD-RW), or the like. A magneto-optical recording medium can be a magneto-optical disk (MO) or the like.

To place the program on the market, portable record media, such as DVDs or CD-ROMs, on which it is recorded are sold. Alternatively, the program is stored in advance on a hard disk in a server computer and is transferred from the server computer to another computer via a network.

When the computer executes this program, it will store the program, which is recorded on a portable record medium or which is transferred from the server computer, on, for example, its hard disk. Then the computer reads the program from its hard disk and performs processes in compliance with the program. The computer can also read the program directly from a portable record medium and perform processes in compliance with the program. Furthermore, each time the program is transferred from the server computer, the computer can perform processes in turn in compliance with the program it receives.

The bandwidth control server stores image data priority corresponding to each disaster type as setting information. When the bandwidth control server acquires disaster information, the bandwidth control server extracts setting information corresponding to a disaster type, determines camera priority on the basis of image data priority defined in the extracted setting information, and ensures a usable bandwidth of a network in order in accordance with the priority. By doing so, in accordance with the priority according to disaster conditions the bandwidth control server can give each camera instructions to send image data.

In addition, the monitoring system which controls the sending of image data obtained by each camera connected to a network by the use of such a bandwidth control server and which displays a picture based on image data acquired on a monitor can display image data for the most important point at each moment on the monitor.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A bandwidth control server which is connected to a plurality of cameras via a network and which controls the sending of image data obtained by the plurality of cameras according to a bandwidth of the network, the bandwidth control server comprising:
    a disaster detection section to acquire disaster occurrence information regarding a disaster which has occurred and advance disaster information regarding a disaster which has not occurred yet and a sign of which has been detected or regarding a disaster the occurrence of which is forecast, and detect a disaster type and a disaster area included in the disaster occurrence information and advance disaster information; a priority determination section to extract setting information corresponding to the specified disaster type from setting information regarding the plurality of cameras which is stored in a setting information storage section and which includes points at which the plurality of cameras are installed, a bandwidth required to send the image data, and image data priority corresponding to the disaster type, and determine priority among cameras installed in the disaster area on the basis of the image data priority defined in the extracted setting information corresponding to the disaster type;
    a network monitoring section to monitor a state of the network and acquire bandwidth information including a bandwidth which can be used for transferring the image data; and
    a bandwidth control section to ensure bandwidths required to send image data obtained by the cameras from among the usable bandwidth of the network which is set in the bandwidth information in descending order of the priority on the basis of the priority among the cameras, and give the cameras for which the bandwidths are ensured instructions to send the image data,
    wherein the stored setting information defines a separate set of priorities of the cameras for each different disaster type.

2. The bandwidth control server according to claim 1, wherein if there is a camera for which a bandwidth for sending image data cannot be ensured, then the bandwidth control section treats a bandwidth which is already ensured for a first camera to send image data as a shared bandwidth and assigns the shared bandwidth in turn to the first camera and the camera for which a bandwidth cannot be ensured.

3. The bandwidth control server according to claim 2, wherein each time a predetermined period of time elapses, the bandwidth control section stops the sending of the image data by the camera to which the shared bandwidth is assigned and assigns a free shared bandwidth to a next highest priority camera on the basis of the priority among the cameras.

4. The bandwidth control server according to claim 1, wherein: if there is a camera for which a bandwidth cannot be ensured, then the bandwidth control section compares the usable bandwidth of the network set in the bandwidth information in a predetermined cycle with a bandwidth required by the camera for which the bandwidth cannot be ensured to send image data, and if the bandwidth required to send the image data can be ensured, then the bandwidth control section ensures the usable bandwidth of the network for the camera.

5. The bandwidth control server according to claim 1, wherein the bandwidth control section assigns predetermined multicast addresses to the cameras for which the bandwidths are ensured, and gives the cameras instructions to make a change to the predetermined multicast addresses.

6. The bandwidth control server according to claim 1, wherein: the priority determination section calculates a bandwidth required to send the image data obtained by all of the cameras installed in the disaster area on the basis of the extracted setting information, compares the bandwidth with the usable bandwidth of the network which is set in the bandwidth information, and does not determine priority among the cameras in the case where the bandwidth required to send the image data obtained by all of the cameras installed in the disaster area can be ensured; and
    if priority among the cameras is not determined, then the bandwidth control section does not ensure bandwidths for the cameras.

7. The bandwidth control server according to claim 1, wherein: directions to be taken by the plurality of cameras are set in the setting information according to the disaster type; and the bandwidth control section extracts directions to be taken by the cameras from the setting information according to the disaster type, gives the cameras for which the bandwidths are ensured instructions to send the image data, and informs the cameras for which the bandwidths are ensured about the extracted directions to be taken.

8. A computer-readable, non-transitory medium storing a bandwidth control program to be executed by a computer connected to a plurality of cameras via a network the bandwidth control program causing the computer to perform a procedure comprising:
    acquiring disaster occurrence information regarding a disaster which has occurred and advance disaster information regarding a disaster which has not occurred yet and a sign of which has been detected or regarding a disaster the occurrence of which is forecast, and detecting a disaster type and a disaster area included in the disaster occurrence information and advance disaster information;

extracting setting information corresponding to the specified disaster type from setting information regarding the plurality of cameras which includes points at which the plurality of cameras are installed, a bandwidth required to send the image data, and image data priority corresponding to the disaster type, and determining priority among cameras installed in the disaster area on the basis of the image data priority defined in the extracted setting information corresponding to the disaster type;

monitoring a state of the network and acquiring bandwidth information including a bandwidth which can be used for transferring the image data; and ensuring bandwidths required to send image data obtained by the cameras from among the usable bandwidth of the network which is set in the bandwidth information in descending order of the priority on the basis of the priority among the cameras, and giving the cameras for which the bandwidths are ensured instructions to send the image data, wherein the setting information defines a separate set of priorities of the cameras for each different disaster type.

9. A monitoring system for acquiring image data obtained by a plurality of cameras and for performing centralized monitoring of a situation, the system comprising:

a disaster information offer server which produces disaster occurrence information by detecting occurrence of a disaster or a sign and produces advance disaster information by detecting a sign of a disaster that has not occurred yet or forecasting a disaster, the disaster occurrence information and advance disaster information including indicating a disaster type of the disaster which has been detected or forecasted and a disaster area influenced by the disaster, which has been detected or forecasted;

a group of cameras connected to a network to send image data obtained by taking a designated direction via the network;

a bandwidth control server including:

a disaster detection section to acquire the disaster occurrence information and the advance disaster information from the disaster information offer server, and detect the disaster type and the disaster area included in the acquired disaster occurrence information and advance disaster information;

a priority determination section to extract setting information corresponding to the specified disaster type from setting information regarding each of the group of cameras which is stored in a setting information storage section and which includes a point at which each camera is installed, a bandwidth required to send the image data, and image data priority according to disaster type; and determine priority among one or more cameras installed in the disaster area on the basis of the image data priority defined in the extracted setting information corresponding to the disaster type, a network monitoring section to monitor a state of the network and acquire bandwidth information including a bandwidth which can be used for transferring the image data, and a bandwidth control section to ensure bandwidths required to send image data obtained by the cameras from among the usable bandwidth of the network which is set in the bandwidth information in descending order of the priority on the basis of the priority among the one or more cameras, and give the one or more cameras for which the bandwidths are ensured instructions to send the image data; and a monitoring unit for to receive and accumulating the image data sent via the network from the one or more cameras for which the bandwidths are ensured and display the image data on a display unit wherein the stored setting information defines a separate set of priorities of the cameras for each different disaster type.

* * * * *